US012513471B2

(12) United States Patent
Hu

(10) Patent No.: US 12,513,471 B2
(45) Date of Patent: Dec. 30, 2025

(54) METHOD FOR IDENTIFYING EARBUD WEARING ERROR AND RELATED DEVICE

(71) Applicant: Huawei Technologies Co., Ltd., Shenzhen (CN)

(72) Inventor: Guocheng Hu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 126 days.

(21) Appl. No.: 18/264,858

(22) PCT Filed: Jan. 18, 2022

(86) PCT No.: PCT/CN2022/072507
§ 371 (c)(1),
(2) Date: Aug. 9, 2023

(87) PCT Pub. No.: WO2022/170925
PCT Pub. Date: Aug. 18, 2022

(65) Prior Publication Data
US 2024/0114295 A1 Apr. 4, 2024

(30) Foreign Application Priority Data
Feb. 10, 2021 (CN) ......................... 202110184112.7

(51) Int. Cl.
*H04R 29/00* (2006.01)
*H04R 1/10* (2006.01)
*H04R 25/00* (2006.01)

(52) U.S. Cl.
CPC ......... *H04R 25/305* (2013.01); *H04R 1/1041* (2013.01)

(58) Field of Classification Search
CPC ............................ H04R 25/305; H04R 1/1042
See application file for complete search history.

(56) References Cited

U.S. PATENT DOCUMENTS

2012/0003937 A1* 1/2012 Zhong ................ H04M 1/6066 455/41.3
2013/0279724 A1* 10/2013 Stafford ............... H04R 1/1041 381/74
(Continued)

FOREIGN PATENT DOCUMENTS

CN 205812319 U 12/2016
CN 106358127 A 1/2017
(Continued)

*Primary Examiner* — Simon King
(74) *Attorney, Agent, or Firm* — Slater Matsil, LLP

(57) ABSTRACT

Embodiments of this application provide a method for identifying an earbud wearing error. An earbud wearing action is detected based on a sensor of an earbud (for example, an acceleration sensor, a gyroscope sensor, or a magnetic field detection sensor), and an electronic device may determine, based on the earbud wearing action, whether a left bud and a right bud are incorrectly worn. Once it is determined that the left bud and the right bud are incorrectly worn, the electronic device may output prompt information by using a screen, to prompt a user that the left bud and the right bud are incorrectly worn. When the left bud and the right bud are incorrectly worn, the electronic device may further switch between a left-ear mode and a right-ear mode.

18 Claims, 23 Drawing Sheets

(56) References Cited

U.S. PATENT DOCUMENTS

| | | | | |
|---|---|---|---|---|
| 2014/0079238 | A1* | 3/2014 | Bastide | H04R 5/033<br>381/74 |
| 2014/0086438 | A1* | 3/2014 | Tachibana | H04R 29/001<br>381/74 |
| 2019/0332141 | A1 | 10/2019 | Guo | |
| 2022/0279263 | A1* | 9/2022 | Le | H04R 1/1041 |

FOREIGN PATENT DOCUMENTS

| | | | |
|---|---|---|---|
| CN | 107801113 | A | 3/2018 |
| CN | 111031432 | A | 4/2020 |
| EP | 2451188 | A2 | 5/2012 |

* cited by examiner

A right bud rotates anticlockwise around a Z-axis (looking at an XOY plane along a negative direction of the Z-axis of the right bud)

A right bud rotates clockwise around a Z-axis (looking at an XOY plane along a negative direction of the Z-axis of the right bud)

METHOD FOR IDENTIFYING EARBUD WEARING ERROR AND RELATED DEVICE

CROSS-REFERENCE TO RELATED APPLICATIONS

This application is a National Stage of International Patent Application No. PCT/CN2022/072507, filed on Jan. 18, 2022, which claims priority to Chinese Patent Application No. 202110184112.7, filed on Feb. 10, 2021, both of which are hereby incorporated by reference in their entireties.

TECHNICAL FIELD

This application relates to the field of electronic technologies, and in particular, to a method for identifying an earbud wearing error and a related device.

BACKGROUND

True wireless stereo (true wireless stereo, TWS) earbuds are popular with consumers for a wireless connection manner. However, a user needs to carefully observe forms of a left bud and a right bud or words "left (L)" and "right (R)" printed on the left bud and the right bud to distinguish the left bud and the right bud, so as to avoid wearing the left bud and the right bud incorrectly.

SUMMARY

Embodiments of this application provide a method for identifying an earbud wearing error and a related device, so as to detect whether a left bud and a right bud are incorrectly worn. Once it is determined that the left bud and the right bud are incorrectly worn, a user may be prompted to manually switch between the left bud and the right bud or directly switch between a left sound channel and a right sound channel, so as to avoid affecting a playback effect presented by audio output.

A method provided in a first aspect may be applied to an audio communications system, where the audio communications system may include a pair of wireless earbuds, and the pair of wireless earbuds may include a first earbud and a second earbud.

The method provided in the first aspect may include: detecting an earbud motion of the first earbud in a process in which a user wears the first earbud, and determining, based on the earbud motion of the first earbud in the process in which the user wears the first earbud, whether the first earbud is incorrectly worn. In this way, whether the earbud is incorrectly worn can be identified based on an action of wearing the earbud.

In the first aspect, the process in which the user wears the first earbud may be a process from taking the first earbud out from an earbud case to wearing the first earbud on the ear of the user. That the first earbud is worn on the ear of the user may be detected by using a wearing detector in the first earbud, and taking the first earbud out from the earbud case may be detected by using an in-case detector.

The audio communications system may further include the earbud case. The earbud case may have a first cavity and a second cavity, which may be respectively used to place the first earbud and the second earbud. The earbud case may further provide charging for the earbud. The in-case detector may include a first charging metal part of the first earbud, the first charging metal part is configured to contact a second charging metal part in the earbud case to obtain charging from the earbud case. The in-case detector may be specifically configured to detect, by using the first charging metal part, that the first earbud is taken out from the earbud case. When it is detected that the first charging metal part changes from being in contact with the second charging metal part to not being in contact with the second charging metal part, it may be determined that the first earbud is taken out from the earbud case. An event that the first earbud is taken out from the earbud case may also be detected by the earbud case by using the second charging metal part.

The audio communications system may further include an electronic device, for example, a smartphone, and a wireless communications connection may be established between the electronic device and the wireless earbud. In the process in which the user wears the first earbud, after the earbud motion of the first earbud is detected by the first earbud, the first earbud may send the earbud motion to the electronic device through a wireless communications connection, and then the electronic device determines, based on the earbud motion, whether the first earbud is incorrectly worn.

Optionally, the electronic device may also establish a communications connection to only one of the earbuds (for example, the first earbud). The electronic device may transmit audio data of a left sound channel and a right sound channel to the first earbud. The first earbud plays a role of audio data forwarding ("routing"), and the first earbud separates audio data of the left sound channel from audio data of the right sound channel and transmits audio data of one of the sound channels to the second earbud. In this case, the determining whether the first earbud is incorrectly worn may be performed by the first earbud. If it is determined that the first earbud is incorrectly worn, the left and right sound channels are switched, and audio data of the other sound channel is transmitted to the second earbud.

In the first aspect, the determining, based on the earbud motion of the first earbud in the process in which the user wears the first earbud, whether the first earbud is incorrectly worn may specifically include: if the earbud motion of the first earbud in the process in which the user wears the first earbud is consistent with a first motion, determining whether the first earbud is incorrectly worn on a second ear of the user, where the first motion is an earbud motion in a process in which the first earbud is incorrectly worn on the second ear. Optionally, if the earbud motion of the first earbud in the process in which the user wears the first earbud is consistent with an earbud motion in a process in which the first earbud is correctly worn on the second ear, it may be determined whether the first earbud is correctly worn on a first ear of the user. The first motion may be obtained in advance, and may be from test data before the earbud is delivered from a factory. A simple example of the first motion may be shown in FIG. 5C, FIG. 5D, FIG. 6C, and FIG. 6D.

In the first aspect, that the earbud motion of the first earbud in the process in which the user wears the first earbud is consistent with a first motion may include: rotation of the first earbud in the process in which the user wears the first earbud is consistent with first rotation; and the first motion may include the first rotation, and the first rotation may include rotation of the first earbud around a Y-axis of the first earbud in the process in which the first earbud is incorrectly worn on the second ear, where a positive direction of the Y-axis of the first earbud points from a center-of-mass of the first earbud to a top of the first earbud, a positive direction of an X-axis points from the center-of-mass of the first earbud to an earbud mouth of the first earbud, and a positive direction of a Z-axis points from the center-of-mass of the first earbud to a right side of the first earbud.

In a case, when the first earbud is taken out from the earbud case, an orientation of an earbud mouth of the first earbud is opposite to an orientation of the first ear. In this case, a rotation angle of the first rotation may be equal to 180° or close to 180°. That the rotation angle is close to 180° means that a difference between the rotation angle of the first rotation and 180° is less than a first angle, for example, less than 10°.

In another case, when the first earbud is taken out from the earbud case, the orientation of the earbud mouth of the first earbud is opposite to an orientation of the second ear. In this case, the rotation angle of the first rotation is equal to 0° or close to 0°. That the rotation angle is close to 0° means that a difference between the rotation angle of the first rotation and 0° is less than a second angle, for example, less than 10°.

In the first aspect, that the earbud motion of the first earbud in the process in which the user wears the first earbud is consistent with a first motion may include: displacement of the first earbud that is in a carrier coordinate system of a head of the user and that is in the process in which the user wears the first earbud is consistent with first displacement; and the first motion may include the first displacement, and the first displacement is displacement of the first earbud that is in the carrier coordinate system of the head of the user and that is in the process in which the first earbud is incorrectly worn on the second ear, where in the carrier coordinate system of the head of the user, a positive direction of a Y-axis points from a head center-of-mass to a top of the head, a positive direction of a Z-axis points from the head center-of-mass to a face, and a positive direction of an X-axis points from the head center-of-mass to a left ear.

If the first earbud is the right bud, the first movement may include: The first earbud moves in a positive direction of an X-axis of the head of the user, moves in a positive direction of a Y-axis of the head of the user, and moves in a negative direction of a Z-axis of the head of the user.

If the first earbud is the left bud, the first motion further includes: The first earbud moves in a negative direction of the X-axis of the head of the user, moves in the positive direction of the Y-axis of the head of the user, and moves in the negative direction of the Z-axis of the head of the user.

In the first aspect, if the first earbud is incorrectly worn, the following manner may be used to avoid an adverse impact caused by incorrect wearing.

In a case that the pair of wireless earbuds is in a single-earbud mode, the electronic device may remind the user that the first earbud is incorrectly worn, so as to avoid a problem that the user wears the earbud uncomfortably.

When the pair of wireless earbuds is in a dual-earbud mode, and in a condition that it is detected that the second earbud is also worn on the ear of the user (that is, earbuds are worn on both ears), the user is reminded to switch between the left bud and the right bud for wearing, as shown in FIG. 14A and FIG. 14B, so as to avoid affecting an audio listening effect.

When the pair of wireless earbuds is in a dual-earbud mode, and in a condition that it is detected that the second earbud is also worn on the ear of the user (that is, earbuds are worn on both ears), left-right sound channel switching may be performed on the first earbud and the second earbud. Herein, after reminders shown in FIG. 14A and FIG. 14B are displayed, if the user still does not manually switch between the left bud and the right bud, the left and right sound channels may be switched, or the user may be not reminded and the left and right sound channels are directly switched.

In the first aspect, determining, based on the earbud motion of the first earbud in the process in which the user wears the first earbud, whether the first earbud is incorrectly worn needs to be calculated by using a detection value of an acceleration sensor in the first earbud when an initial posture of the first earbud relative to the user is known. To know the initial posture of the first earbud relative to the user, an implementation is that the user may determine, on an electronic device (such as a mobile phone) that the earbud communicates with, an initial posture of the earbud, that is, a posture of the earbud formed when the earbud is taken out from the earbud case, for example, an orientation of the earbud mouth relative to the user. In another implementation, the initial posture may be determined based on a posture in which the earbud case is held by the user. For example, a recommended holding posture of the earbud case is usually convenient for the user to take and use the earbud, and a case shown in FIG. 5A is provided.

In the first aspect, the motion sensor may be used to detect an earbud motion generated after the first earbud is worn on the ear of the user, and it is determined, based on the earbud motion, to calibrate a result of the foregoing determining.

After the earbud is worn on the ear of the user, the earbud may move with a head action of the user, to generate the earbud motion. The head action may be shown in FIG. 7A and FIG. 7B, FIG. 8A and FIG. 8B, FIG. 9A and FIG. 9B, FIG. 10A and FIG. 10B, FIG. 11A and FIG. 11B, and FIG. 12A and FIG. 12B.

Specifically, after the earbud motion generated after the first earbud is worn on the ear of the user is detected by the first earbud, the first earbud may send the earbud motion to the electronic device through the wireless communications connection, and then the electronic device calibrates a preliminary determining result based on the earbud motion. Optionally, the electronic device may also establish a communications connection to only one of the earbuds (for example, the first earbud). The electronic device may transmit audio data of a left sound channel and a right sound channel to the first earbud. The first earbud plays a role of audio data forwarding ("routing"), and the first earbud separates audio data of the left sound channel from audio data of the right sound channel and transmits audio data of one of the sound channels to the second earbud. In this case, calibrating the result of the foregoing determining may be performed by the first earbud. If it is determined that the earbud is incorrectly worn, the left and right sound channels are switched, and audio data of the other sound channel is transmitted to the second earbud.

If the result of the foregoing determining is that the first earbud is incorrectly worn on the second ear, calibration may specifically include: if the earbud motion generated after the first earbud is worn on the ear of the user is consistent with a second motion, determining that the result of the foregoing determining is correct, that is, determining that the first earbud is incorrectly worn. The second motion includes an earbud motion generated with a head motion after the first earbud is incorrectly worn on the second ear.

In the first aspect, that the earbud motion generated after the first earbud is worn on the ear of the user is consistent with a second motion may include: after the first earbud is worn on the ear of the user, rotation of the first earbud is consistent with second rotation; and the second motion may include the second rotation, and the second rotation is rotation, generated with the head motion after the first earbud is incorrectly worn on the second ear, around one or more of the Y-axis, the X-axis, and the Z-axis of the first earbud, where the positive direction of the Y-axis of the first earbud points from the center-of-mass of the first earbud to the top of the first earbud, the positive direction of the X-axis points from the center-of-mass of the first earbud to the earbud mouth of the first earbud, and the positive direction of the Z-axis points from the center-of-mass of the first earbud to the right side of the first earbud.

In the first aspect, that the earbud motion generated after the first earbud is worn on the ear of the user is consistent with a second motion may include: after the first earbud is worn on the ear of the user, displacement of the first earbud in the carrier coordinate system of the head of the user is consistent with second displacement; and the second motion includes the second displacement, and the second displacement is displacement on one or more of the Y-axis, the X-axis, and the Z-axis of the head of the user generated with the head motion after the first earbud is incorrectly worn on the second ear, where in the carrier coordinate system of the head of the user, the positive direction of the Y-axis points from the head center-of-mass to the top of the head, the positive direction of the Z-axis points from the head center-of-mass to the face, and the positive direction of the X-axis points from the head center-of-mass to the left ear.

A method provided in a second aspect may be applied to an audio communications system, where the audio communications system may include a pair of wireless earbuds, and the pair of wireless earbuds may include a first earbud and a second earbud.

The method provided in the second aspect may include: detecting that the first earbud is worn on an ear of a user; detecting an earbud motion generated after the first earbud is worn on the ear of the user; and determining, based on the earbud motion generated after the first earbud is worn on the ear of the user, whether the first earbud is incorrectly worn on a second ear of the user. In this way, whether the earbud is incorrectly worn may be identified based on an earbud motion generated with a head action after the earbud is worn on the ear of the user.

After the earbud is worn on the ear of the user, the earbud may move with a head action of the user, to generate the earbud motion. The head action may be shown in FIG. 7A and FIG. 7B, FIG. 8A and FIG. 8B, FIG. 9A and FIG. 9B, FIG. 10A and FIG. 10B, FIG. 11A and FIG. 11B, and FIG. 12A and FIG. 12B.

Specifically, after the earbud motion generated after the first earbud is worn on the ear of the user is detected by the first earbud, the first earbud may send the earbud motion to the electronic device through the wireless communications connection, and then the electronic device calibrates a preliminary determining result based on the earbud motion. Optionally, the electronic device may also establish a communications connection to only one of the earbuds (for example, the first earbud). The electronic device may transmit audio data of a left sound channel and a right sound channel to the first earbud. The first earbud plays a role of audio data forwarding ("routing"), and the first earbud separates audio data of the left sound channel from audio data of the right sound channel and transmits audio data of one of the sound channels to the second earbud. In this case, calibrating the result of the foregoing determining may be performed by the first earbud. If it is determined that the earbud is incorrectly worn, the left and right sound channels are switched, and audio data of the other sound channel is transmitted to the second earbud.

If the result of the foregoing determining is that the first earbud is incorrectly worn on the second ear, calibration may specifically include: if the earbud motion generated after the first earbud is worn on the ear of the user is consistent with a second motion, determining that the result of the foregoing determining is correct, that is, determining that the first earbud is incorrectly worn. The second motion includes an earbud motion generated with a head motion after the first earbud is incorrectly worn on the second ear.

In the second aspect, that the earbud motion generated after the first earbud is worn on the ear of the user is consistent with a second motion may include: after the first earbud is worn on the ear of the user, rotation of the first earbud is consistent with second rotation; and the second motion may include the second rotation, and the second rotation is rotation, generated with the head motion after the first earbud is incorrectly worn on the second ear, around one or more of a Y-axis, an X-axis, and a Z-axis of the first earbud, where a positive direction of the Y-axis of the first earbud points from a center-of-mass of the first earbud to a top of the first earbud, a positive direction of the X-axis points from the center-of-mass of the first earbud to an earbud mouth of the first earbud, and a positive direction of the Z-axis points from the center-of-mass of the first earbud to a right side of the first earbud.

In the second aspect, that the earbud motion generated after the first earbud is worn on the ear of the user is consistent with a second motion may include: after the first earbud is worn on the ear of the user, displacement of the first earbud in a carrier coordinate system of a head of the user is consistent with second displacement; and the second motion includes the second displacement, and the second displacement is displacement on one or more of a Y-axis, an X-axis, and a Z-axis of the head of the user generated with the head motion after the first earbud is incorrectly worn on the second ear, where in the carrier coordinate system of the head of the user, a positive direction of the Y-axis points from a head center-of-mass to a top of the head, a positive direction of the Z-axis points from the head center-of-mass to a face, and a positive direction of the X-axis points from the head center-of-mass to a left ear.

A method provided in a third aspect may be applied to an audio communications system, where the audio communications system may include a pair of wireless earbuds, the pair of wireless earbuds may include a first earbud and a second earbud, the pair of wireless earbuds is provided with an earbud case, and the earbud case has a first cavity and a second cavity that are respectively configured to place the first earbud and the second earbud.

The method provided in the third aspect may include: detecting that the first earbud is removed from an ear of a user; detecting that the first earbud is placed in the earbud case; detecting an earbud motion of the first earbud in a process in which the user takes off the first earbud and puts the first earbud back into the earbud case; and determining, based on the earbud motion of the first earbud in the process in which the user takes off the first earbud and puts the first earbud back into the earbud case, whether the first earbud is incorrectly placed in the second cavity. In this way, when the user places the earbud back to the earbud case after using the earbud, the user can determine whether a left bud and a right bud are incorrectly placed. In a case of switching between a left bud mode and a right bud mode when the left bud and the right bud are incorrectly placed, the user does not need to manually switch between a position of the left bud and a position of the right bud, thus avoiding a risk of wearing the earbuds incorrectly when the user takes and uses the left bud and the right bud next time.

In the third aspect, the process in which the user takes off the first earbud and puts the first earbud back into the earbud case may be a process from removing the first earbud from the ear of the user to placing the first earbud back into the earbud case. The removing the first earbud from the ear of the user may be detected by using a wearing detector in the first earbud, and the placing the first earbud back into the earbud case may be detected by using an in-case detector.

In addition to being configured to store the first earbud and the second earbud, the earbud case may further provide charging for the earbud. The in-case detector may include a first charging metal part of the first earbud, the first charging metal part is configured to contact a second charging metal part in the earbud case to obtain charging from the earbud case. The in-case detector may be specifically configured to detect, by using the first charging metal part, that the first earbud is placed in the earbud case. When it is detected that the first charging metal part changes from not being in contact with the second charging metal part to being in contact with the second charging metal part, it may be determined that the first earbud is placed in the earbud case. An event that the first earbud is placed in the earbud case may also be detected by the earbud case by using the second charging metal part.

The audio communications system may further include an electronic device, for example, a smartphone, and a wireless communications connection may be established between the electronic device and the wireless earbud. Specifically, in the process in which the user takes off the first earbud and puts the first earbud back into the earbud case, after the earbud motion of the first earbud is detected by the first earbud, the first earbud may send the earbud motion to the electronic device through the wireless communications connection, and then the electronic device determines, based on the earbud motion, whether the earbud is incorrectly placed.

In the third aspect, the determining, based on the earbud motion of the first earbud in the process in which the user takes off the first earbud and puts the first earbud back into the earbud case, whether the first earbud is incorrectly placed in the second cavity may specifically include: if the earbud motion of the first earbud in the process in which the user takes off the first earbud and puts the first earbud back into the earbud case is consistent with a third motion, determining that the first earbud is incorrectly placed in the second cavity, where the third motion includes an earbud motion generated by the first earbud in a process from taking off the first earbud by the user to incorrectly placing the first earbud in the second cavity.

In the third aspect, that the earbud motion of the first earbud in the process in which the user takes off the first earbud and puts the first earbud back into the earbud case is consistent with a third motion may include: rotation of the first earbud in the process in which the user takes off the first earbud and puts the first earbud back into the earbud case is consistent with third rotation; and the third motion includes the third rotation, and the third rotation may include rotation of the first earbud around a Y-axis of the first earbud in the process from taking off the first earbud by the user to incorrectly placing the first earbud in the second cavity, where a positive direction of the Y-axis of the first earbud points from a center-of-mass of the first earbud to a top of the first earbud, a positive direction of an X-axis points from the center-of-mass of the first earbud to an earbud mouth of the first earbud, and a positive direction of a Z-axis points from the center-of-mass of the first earbud to a right side of the first earbud.

In a case, before the first earbud is taken off, the first earbud is correctly worn on a first ear of the user. In this case, a rotation angle of the third rotation may be equal to 180° or close to 180°. That the rotation angle is close to 180° means that a difference between the rotation angle of the third rotation and 180° is less than a third angle, for example, less than 10°.

In another case, before the first earbud is taken off, the first earbud is incorrectly worn on a second ear of the user. In this case, a rotation angle of the third rotation is equal to 0° or close to 0°. That the rotation angle is close to 0° means that a difference between the rotation angle of the third rotation and 0° is less than a fourth angle, for example, less than 10°.

In the third aspect, in a case that it is detected that the second earbud is also placed in the earbud case, if the first earbud is incorrectly placed in the second cavity, switching between a left bud mode and a right bud mode may be performed for the first earbud and the second earbud.

A method provided in a fourth aspect may be applied to an audio communications system, where the audio communications system may include a pair of wireless earbuds, the pair of wireless earbuds may include a first earbud and a second earbud, the pair of wireless earbuds is provided with an earbud case, and the earbud case has a first cavity and a second cavity that are respectively configured to place the first earbud and the second earbud. A charging metal part that is used to charge the first earbud by default is disposed in the first cavity, and a charging metal part that is used to charge the second earbud by default is disposed in the second cavity. Correspondingly, a first earbud and a second earbud each have a charging metal part, which may be used to contact the charging metal part in a corresponding cavity to obtain charging of the earbud case.

The method provided in the fourth aspect may include: The earbud case may read, by using the charging metal part, whether a left bud or a right bud is placed in each cavity, or the earbud may read, by using the charging metal part on the earbud, a cavity in which the earbud is located, so as to determine whether the left bud and the right bud are incorrectly placed. Once it is determined that the earbud is incorrectly placed, the earbud case may communicate with the earbud to switch between the left bud mode and the right bud mode.

Not limited to the charging metal part, a near field communications component, a laser transceiver, an infrared transceiver, and the like may be separately disposed in the first cavity and the second cavity of the earbud case. These components may also be used to detect whether an earbud is placed in the cavity and identify whether the earbud placed in the cavity is the left bud or the right bud. Therefore, these components can also be used to detect whether the earbud is incorrectly placed. Correspondingly, the left bud and the right bud each may also have a charging metal component, a near field communications component, a laser transceiver, an infrared transceiver, and the like, and may communicate with corresponding communications components in the first cavity and the second cavity by using these components, so as to detect whether the earbud is placed in the cavity and identify a cavity in which the earbud is placed. Therefore, these components can also be used to detect whether the earbud is incorrectly placed.

It can be learned that according to the method provided in the fourth aspect, when the user places the earbud back to the earbud case after using the earbud, the user can determine whether the left bud and the right bud are incorrectly placed. In a case of switching between a left bud mode and a right bud mode when the left bud and the right bud are incorrectly placed, the user does not need to manually switch between a position of the left bud and a position of the right bud, thus avoiding a risk of wearing the earbuds incorrectly when the user takes and uses the left bud and the right bud next time.

According to a fifth aspect, an electronic device is provided, including a plurality of functional units, configured to correspondingly perform steps performed by an electronic device in the method provided in the first aspect, the second aspect, and the third aspect.

According to a sixth aspect, an electronic device is provided, and may be configured to perform the method described in the first aspect, the second aspect, and the third aspect. The electronic device may include a wireless transceiver, a processor, and a memory. The wireless transceiver is configured to receive and send a signal. The memory stores one or more programs, and the processor invokes the one or more programs, so that a computer performs steps performed by the electronic device in the method described in the first aspect, the second aspect, and the third aspect.

According to a seventh aspect, an earbud is provided, including a plurality of function units, configured to correspondingly perform steps performed by the earbud in the method provided in the first aspect, the second aspect, the third aspect, and the fourth aspect.

According to an eighth aspect, an earbud is provided, and may be configured to perform the method described in the first aspect, the second aspect, the third aspect, and the fourth aspect. The earbud may include a motion sensor, a wearing detection sensor, a wireless transceiver, a processor, and a memory. The wireless transceiver is configured to receive and send a signal, the memory stores one or more programs, and the processor invokes the one or more programs, so that a computer performs steps performed by the earbud in the method described in the first aspect, the second aspect, the third aspect, and the fourth aspect.

According to a ninth aspect, a computer-readable storage medium is provided. The readable storage medium stores instructions, and when the instructions are run on one or more computers, the one or more computers are enabled to perform the method for replacing an accessory theme described in the first aspect, the second aspect, the third aspect, and the fourth aspect.

According to a tenth aspect, a computer program product including instructions is provided. When the instructions are run on one or more computers, the one or more computers are enabled to perform the method for replacing an accessory theme described in the first aspect, the second aspect, the third aspect, and the fourth aspect.

BRIEF DESCRIPTION OF THE DRAWINGS

To describe technical solutions in embodiments of this application more clearly, the following describes the accompanying drawings used in embodiments of this application.

DETAILED DESCRIPTION OF ILLUSTRATIVE EMBODIMENTS

The following describes embodiments of the present invention with reference to the accompanying drawings in embodiments of the present invention.

Figure 1A:
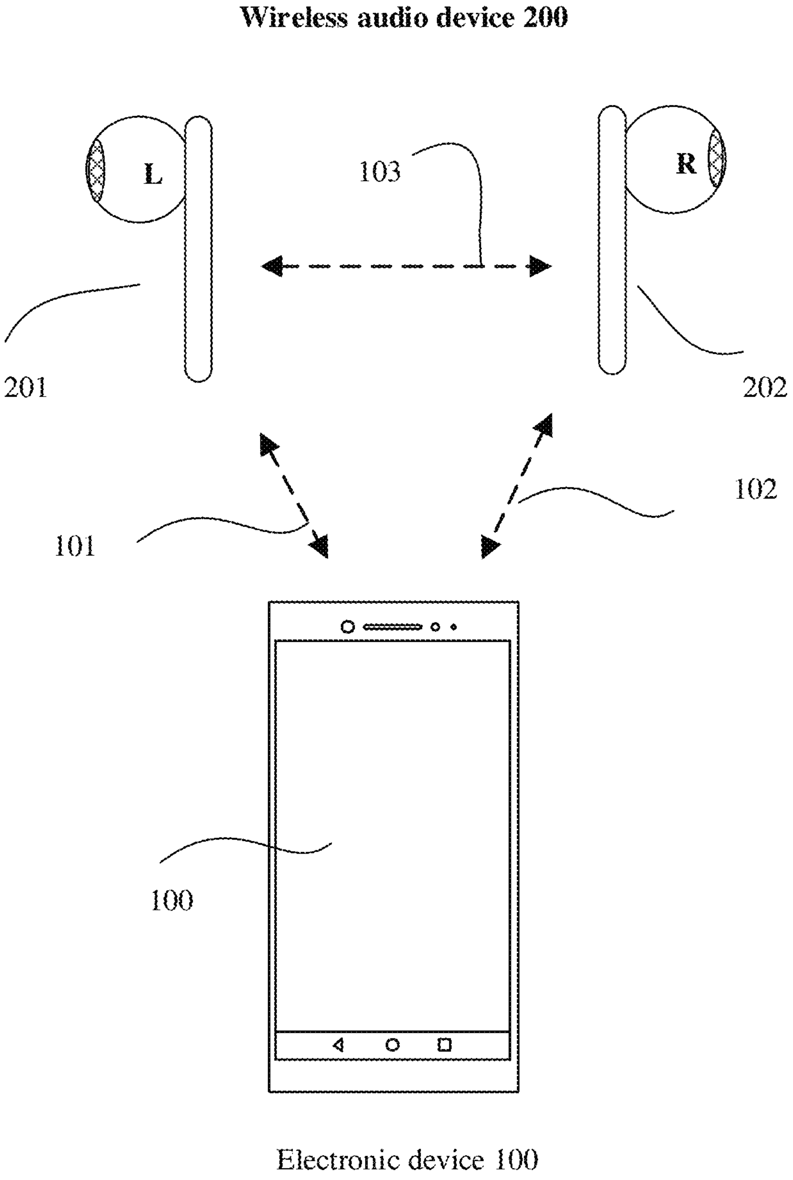
FIG. 1A is a schematic diagram of an audio communications system according to an embodiment of this application.

FIG. 1A shows an example of a wireless audio system in this application. The wireless audio system may include an electronic device 100 and a wireless earbud 200. The wireless earbud 200 may include a left bud 201 and a right bud 202.

There may be no cable connection between the left bud 201 and the right bud 202. The left bud 201 and the right bud 202 may communicate with each other by using a wireless communications connection 103 instead of a wired communications connection. For example, the left bud 201 and the right bud 202 may be respectively a left bud and a right bud of a pair of true wireless stereo (true wireless stereo, TWS) earbuds.

In the wireless audio system, the left bud 201 and the right bud 202 may separately establish a wireless communications connection to the electronic device 100. For example, a wireless communications connection 101 may be established between the left bud 201 and the electronic device 100, and audio data, a play control message, a call control message, and the like may be exchanged by using the wireless communications connection 101. Similarly, a wireless communications connection 102 may be established between the electronic device 100 and the right bud 202, and audio data, a play control message, and a call control message may be exchanged by using the wireless communications connection 102.

The wireless audio system shown in FIG. 1A may be a wireless audio system implemented based on a Bluetooth protocol. That is, a wireless communications connection (for example, the wireless communications connection 101, the wireless communications connection 102, or the wireless communications connection 103) between two of the electronic device 100, the left bud 201, and the right bud 202 may be a Bluetooth communications connection.

In addition to Bluetooth, the wireless earbud 200 may communicate with the electronic device 100 in another manner, for example, a wireless fidelity (wireless fidelity, Wi-Fi), a Wi-Fi direct (Wi-Fi direct), or a cellular mobile communications manner.

It should be noted that, in this embodiment of this application, an example in which the electronic device 100 is a mobile phone is used, and the electronic device 100 may alternatively be a watch, a tablet computer, a personal computer, or the like, which is not limited herein.

FIG. 1A shows an example of structures of a left bud 201 and a right bud 202 in a wireless audio system. Both the left bud 201 and the right bud 202 may include an audio module, a communications module, and a sensor. The audio module may be configured to convert audio data into sound, and may be specifically an electro-acoustic transducer (electro-acoustic transducer). The communications module may be configured to communicate with another device such as the electronic device 100. The communications module may be a Bluetooth module, or may be a communications module of another communications type such as Wi-Fi. The sensor may include an acceleration sensor, a gyroscope sensor, an infrared sensor, and the like. The acceleration sensor and the gyroscope sensor may be specifically configured to detect a motion posture of the left bud 201 or the right bud 202, for example, a movement displacement and a rotation angle. The infrared sensor may be specifically configured to detect an in-ear state of the left bud 201 or the right bud 202, for example, whether the left bud 201 or the right bud 202 is worn in an ear of a user.

Figure 2:
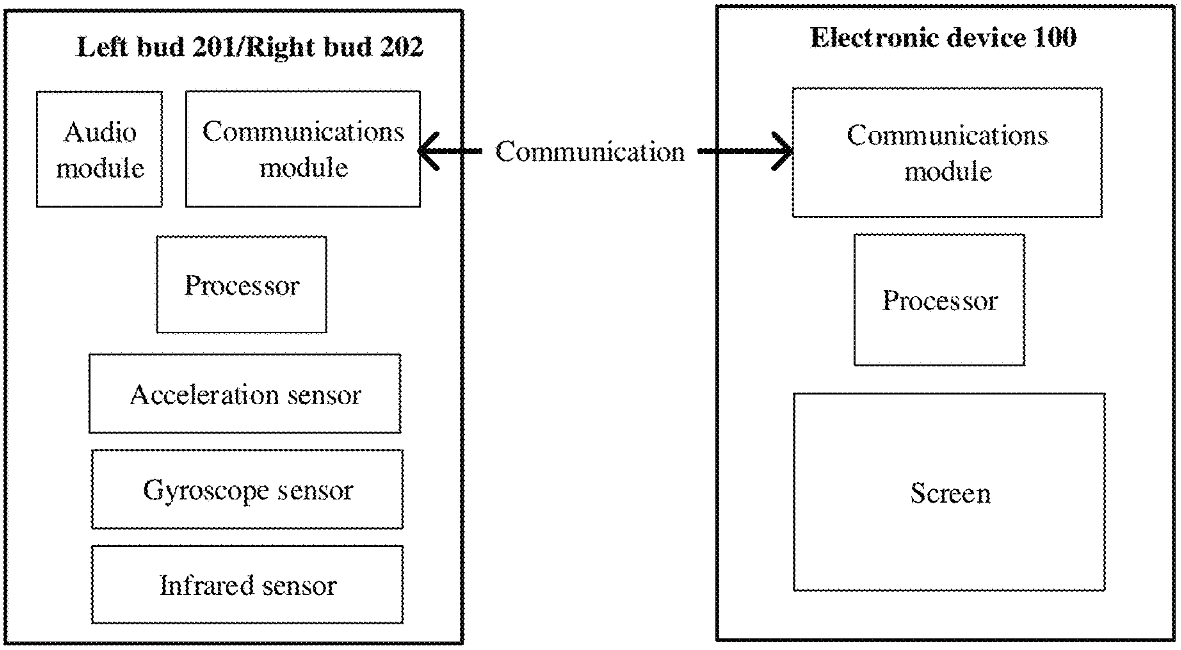
FIG. 2 is a schematic diagram of a structure of an audio communications system and a related device according to an embodiment of this application.

Audio modules, communications modules, and sensors in the left bud 201 and the right bud 202 are coupled to a processor, and the processor may be responsible for reading an instruction in a memory, decoding the instruction, and executing the instruction, to implement steps, on an earbud side, of the method for identifying an earbud wearing error provided in this application. In the method for identifying an earbud wearing error provided in this application, the left bud 201 or the right bud 202 may detect a motion posture of the earbud, such as a movement displacement or a rotation angle, and may report the motion posture to the electronic device 100. As shown in FIG. 2, the electronic device 100 may communicate with the earbud by using the communications module, receive information about the motion posture of the earbud reported by the earbud, battery level information of the earbud, and the like, analyze the motion posture of the earbud by using the processor, and output prompt information by using a screen, to indicate a remaining battery level of the earbud, and the like.

Figure 1B:
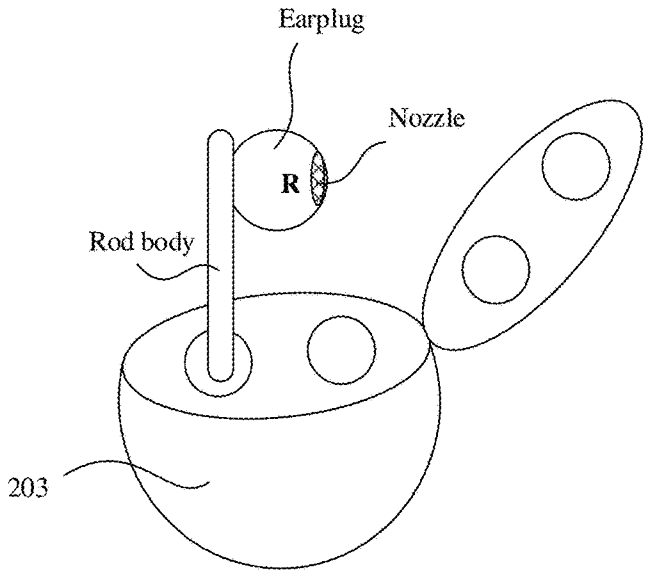
FIG. 1B is a schematic diagram of a wireless earbud according to an embodiment of this application.

Not limited to what is shown in FIG. 2, the left bud 201 and the right bud 202 may further include other components such as a receiver and an indicator. Physical forms, sizes, and the like of the left bud 201 and the right bud 202 are not limited in this application. As shown in FIG. 1B, the wireless earbud 200 may be further configured with a storage case 203 for the left bud 201 and the right bud 202. The storage case 203 may be configured to store the left bud 201 and the right bud 202, may even provide a charging function for the left bud 201 and the right bud 202, and may also be referred to as an earbud case or a charging case. The storage case 203 may be independent of another electronic device, or may be integrated into another electronic device, for example, a component that is designed in a wearable device such as a mobile phone or a smartwatch and that is used to store earbuds. As shown in FIG. 1B, the earbud (for example, the right bud) may include two main structures: an earplug and a rod body. A part of the earplug that is inserted into an ear is provided with a nozzle, and a layer of fine mesh is generally disposed on the nozzle. A size of the rod body may be large or small, and a form of the rod body may also be diversified. Optionally, the left bud and the right bud may not include the rod body. In a design manner of a left bud and a right bud that does not include the rod body, the left bud and the right bud may be set to a same shape.

An embodiment of this application provides a method for identifying an earbud wearing error. An earbud wearing action is detected based on the sensor of the earbud (for example, an acceleration sensor, a gyroscope sensor, or a magnetic field detection sensor), and the electronic device may determine, based on the earbud wearing action, whether the left bud and the right bud are incorrectly worn. Once it is determined that the left bud and the right bud are incorrectly worn, the electronic device may output prompt information by using a screen, to prompt the user that the left bud and the right bud are incorrectly worn. When the left bud and the right bud are incorrectly worn, optionally, the electronic device may further automatically switch between a left-ear mode and a right-ear mode. Even if the user does not manually switch between the left bud and the right bud, a playback effect presented by audio output is not affected. In this way, miniaturization of the earbud may be further supported, and it is not required that there is a difference between the left bud and the right bud.

The acceleration sensor in the earbud may detect a movement value such as displacement and an acceleration when the earbud moves. The gyroscope sensor in the earbud may detect which rotation is generated when the earbud moves and a corresponding rotation value. In this embodiment of this application, motions of the earbud generated in two cases are mainly focused: an earbud motion in a process in which the user wears the earbud (for example, the user picks up the earbud and plugs the earbud into an ear) and an earbud motion caused by a head motion of the user after the user wears the earbud. When the user wears the earbud, head rotation of the user may cause a motion of the worn earbud, and displacement and a rotation value generated by the motion may be separately detected by the acceleration sensor and the gyroscope sensor. To improve measurement accuracy, in addition to the acceleration sensor and the gyroscope sensor, the magnetic field detection sensor, even a positioning sensor, and the like may be further combined to assist in detecting the earbud motion.

Figure 3:
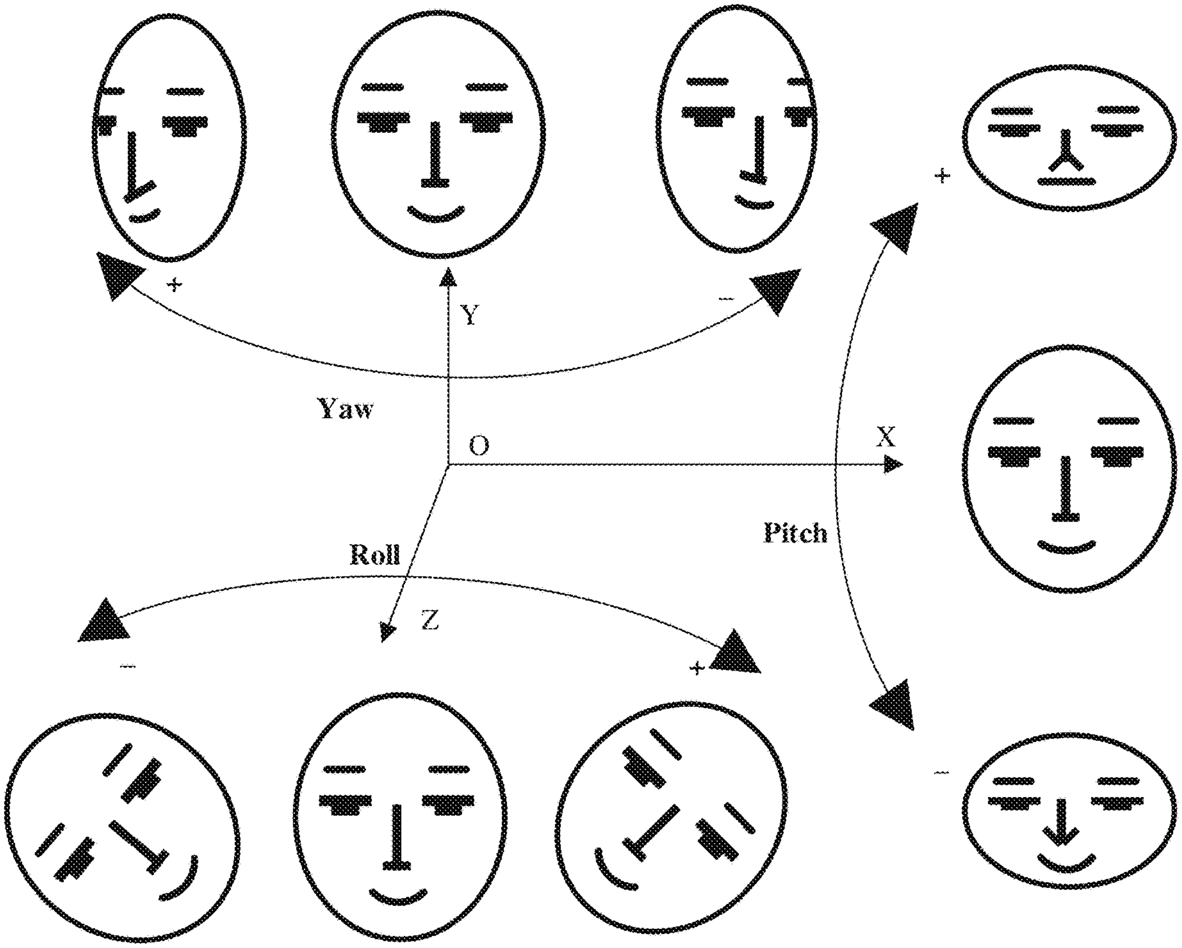
FIG. 3 is a schematic diagram of several cases of head rotation.
Figure 4:
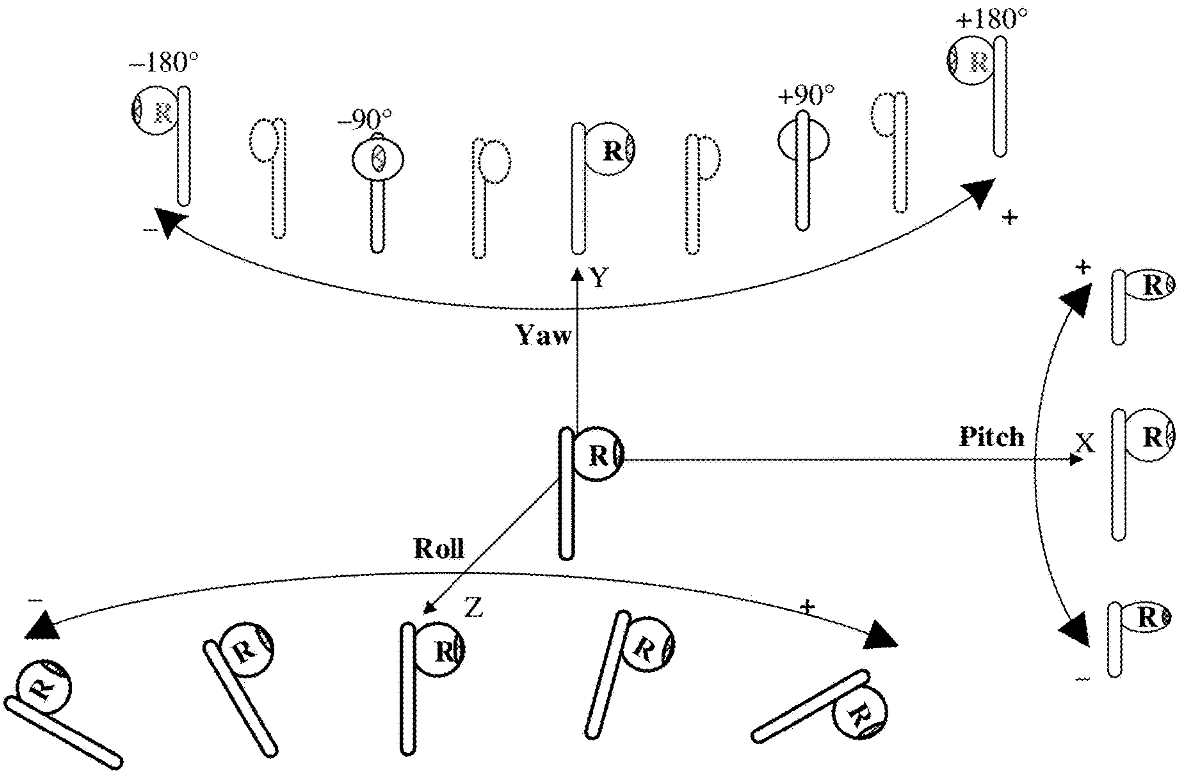
FIG. 4 is a schematic diagram of several right bud rotation cases.

FIG. 3 and FIG. 4 separately show typical human head rotation and earbud rotation, where a coordinate system O-XYZ may be a carrier coordinate system. In the carrier coordinate system, a center-of-mass of a moving carrier is used as an origin, and generally, a coordinate system is formed based on a structural direction of the moving carrier. For example, for a carrier coordinate system of a human head, a Y-axis is in a direction from the origin to a top of the head, a Z-axis is in a direction from the origin to a front of a face, and an X-axis is in a direction from the origin to a left ear. For a carrier coordinate system of the earbud, a Y-axis is in a direction from the origin to a top of the earplug, a Z-axis is in a direction from the origin to two sides of the earplug, and an X-axis is in a direction from the origin to an earbud mouth.

As shown in FIG. 3, one or more of three types of rotation are generated when the human head moves. The three types of rotation include rotation around the Y-axis, rotation around the Z-axis, and rotation around the X-axis. A rotation value of rotation around the Y-axis may be referred to as a yaw angle (Yaw), a rotation value of rotation around the Z-axis may be referred to as a roll angle (Roll), and a rotation value of rotation around the X-axis may be referred to as a pitch angle (Pitch). These rotation values may also be collectively referred to as an attitude angle or an Euler angle. In FIG. 3, Yaw being a positive value may indicate that the user turns the head rightwards, and Yaw being a negative value may indicate that the user turns the head leftwards; Roll being a positive value may indicate that the user leans to a left shoulder, and Roll being a negative value may indicate that the user leans to a right shoulder; and Pitch being a positive value may indicate that the user looks up, and Pitch being a negative value may indicate that the user looks down.

As shown in FIG. 4, one or more of three types of rotation are also generated when the earbud (the right bud is used as an example in the figure) moves. A difference lies in that rotation values of the three types of rotation of the earbud may be set in a larger range, for example, a rotation value is ±180°, and a maximum rotation angle of the human head generally cannot exceed ±90°.

An earbud motion (which may be referred to as a "wearing earbud motion" for short) generated in a process in which the user takes out the earbud from the earbud case and before the user wears the earbud on an ear reflects an action of the user wearing the earbud, and may be used to determine whether the earbud is incorrectly worn. Details are described below.

1. Wearing Earbud Motion

The following uses the right bud as an example to compare a wearing earbud motion generated when the earbud is incorrectly worn and a wearing earbud motion generated when the earbud is correctly worn.

Figure 5A:
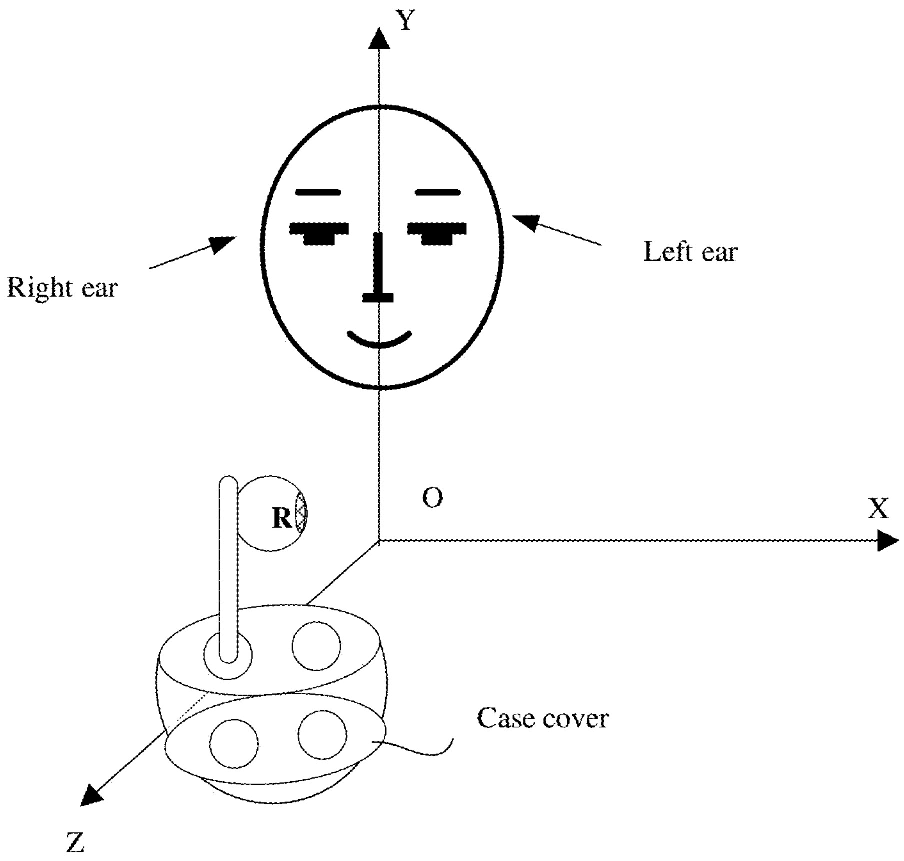
FIG. 5A to FIG. 5D are schematic diagrams of some earbud motions according to an embodiment of this application.

It is assumed that an initial posture of the right bud is shown in FIG. 5A, an orientation of an earbud mouth of the right bud (right bud) is opposite to an orientation of a right ear of the user, and an orientation of an earbud mouth of the left bud (left bud) is opposite to an orientation of a left ear of the user. The initial posture may be a posture of the right bud formed when the right bud is taken out from the earbud case. The coordinate system O-XYZ in the figure is the carrier coordinate system of the human head. The initial posture shown in FIG. 5A may be most frequently used when the user wears the earbud because a design party of the earbud may more likely provide earbud wearing experience in this form based on user experience, to make it easier for the user to wear the earbud. In this way, the user does not need to rotate the earbud to adjust the orientation of the earbud mouth. The user can directly align and wear the right bud on the right ear by picking up the right bud, and can directly align and wear the left bud on the left ear by picking up the left bud.

Figure 5B:
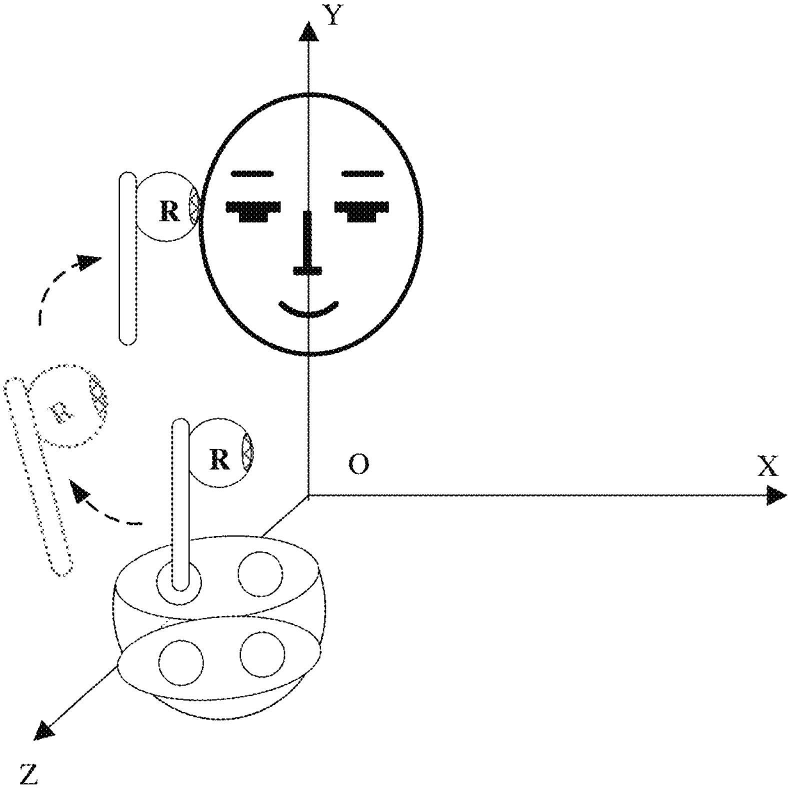

FIG. 5B shows an example of an earbud motion generated in a process in which the user correctly wears the earbud in a case shown in FIG. 5A. The right bud may detect that a rotation angle of the right bud around the Y-axis is very small (close to 0°). Because an orientation of an earbud mouth of the right bud is opposite to the orientation of the right ear of the user, the user may align and wear the right bud on the right ear without adjusting the orientation of the earbud mouth.

Figure 5C:
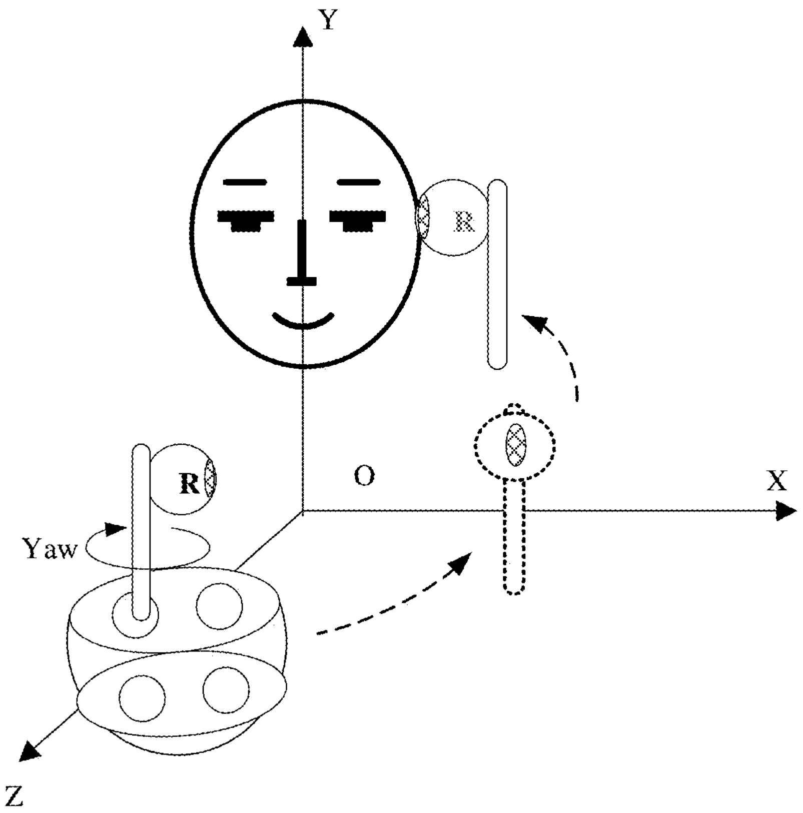
Figure 5D:
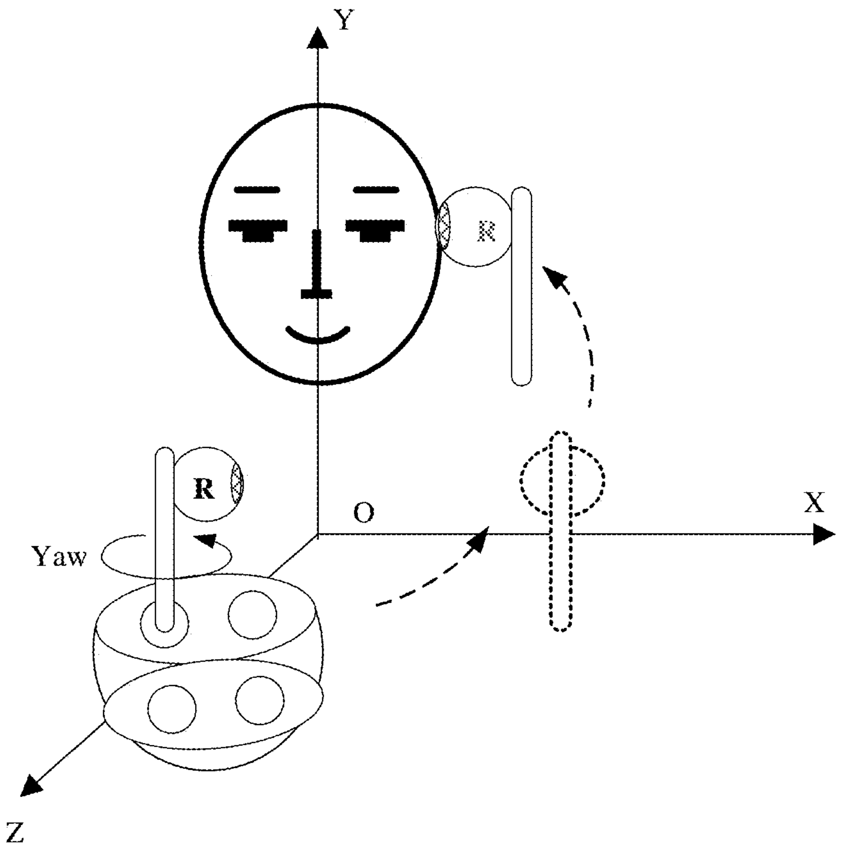

FIG. 5C and FIG. 5D show examples of an earbud motion generated in a process in which the user incorrectly wears the earbud in a case shown in FIG. 5A. In the process of wearing the earbud shown in FIG. 5C, the right bud may detect that the right bud rotates around the Y-axis clockwise by 180°. Because the orientation of the earbud mouth of the right bud is not opposite to the orientation of the right ear of the user, the user needs to rotate the right bud by half a circle, to adjust the orientation of the earbud mouth of the right bud to be opposite to the orientation of the right ear of the user. In the process of wearing the earbud shown in FIG. 5D, the right bud may detect that the right bud rotates around the Y-axis anticlockwise by 180°.

It can be learned from FIG. 5A to FIG. 5D that, for the right bud with the initial posture shown in FIG. 5A, an action of correctly wearing the earbud is different from an action of incorrectly wearing the earbud, for example, rotation angles around the Y-axis are different. In this way, the action of incorrectly wearing the earbud can be distinguished.

A motion sensor (such as the gyroscope sensor) in the earbud may detect whether the earbud rotates around the Y-axis. The rotation angle around the Y-axis may be an accumulated rotation angle, that is, a rotation angle around the Y-axis accumulated in a process from taking the earbud out from the earbud case to wearing the earbud on the ear of the user. In this process, rotation angles in opposite directions may cancel out each other. For example, if the earbud first rotates around the Y-axis by +90°, and then rotates around the Y-axis by −90°, an accumulated rotation angle is 0°. In a process of wearing the right bud correctly or incorrectly, the right bud may also rotate around the X-axis or the Z-axis. Whether the right bud is incorrectly worn may be determined mainly by rotation around the Y-axis. Because whether the right bud is incorrectly worn mainly depends on whether the orientation of the earbud mouth of the right bud is opposite to the orientation of the right ear of the user, and whether the orientation of the earbud mouth of the right bud is opposite to the orientation of the right ear of the user may be analyzed mainly by referring to rotation of the right bud around the Y-axis.

Figure 6A:
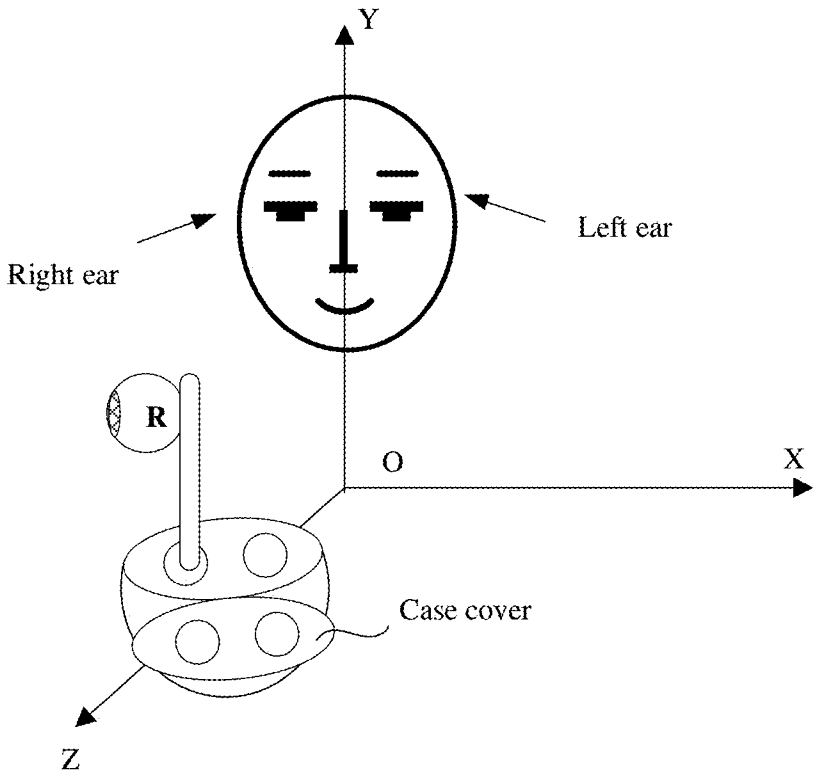
FIG. 6A to FIG. 6D are schematic diagrams of other earbud motions according to an embodiment of this application.

Not limited to the initial posture shown in FIG. 5A, there may be another initial posture. For example, as shown in FIG. 6A, when the user opens the earbud case, the orientation of the earbud mouth of the right bud (right bud) is opposite to the orientation of the left ear of the user, and the orientation of the earbud mouth of the left bud (left bud) is the same as the orientation of the right ear of the user. The case shown in FIG. 6A may usually occur on a condition that the user takes the earbud case reversely. Certainly, it is not excluded that wearing experience provided by an earbud designer is like this.

Figure 6B:
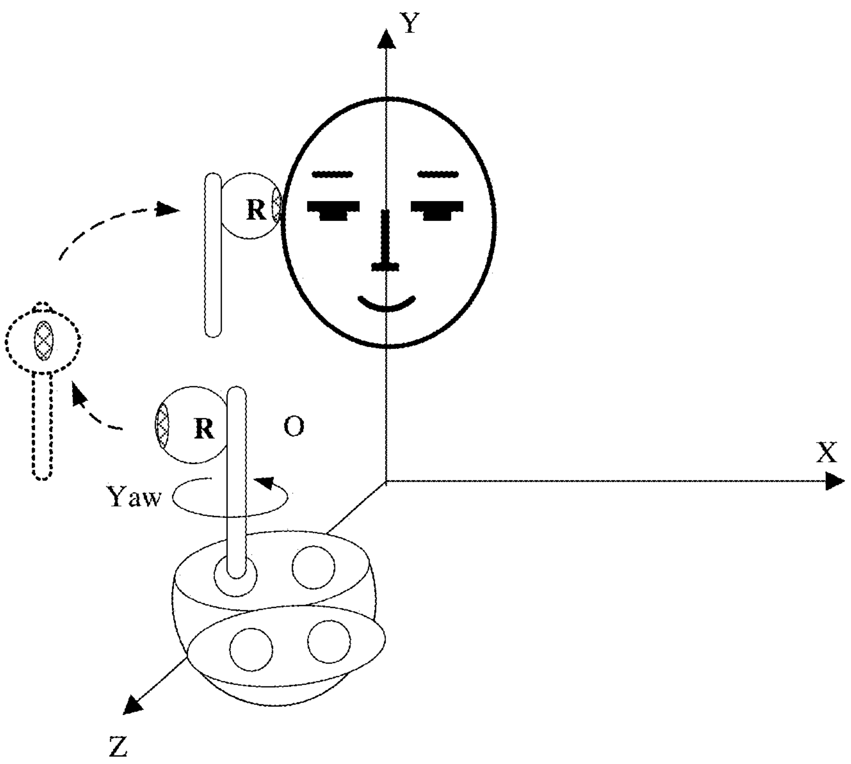
Figure 6C:
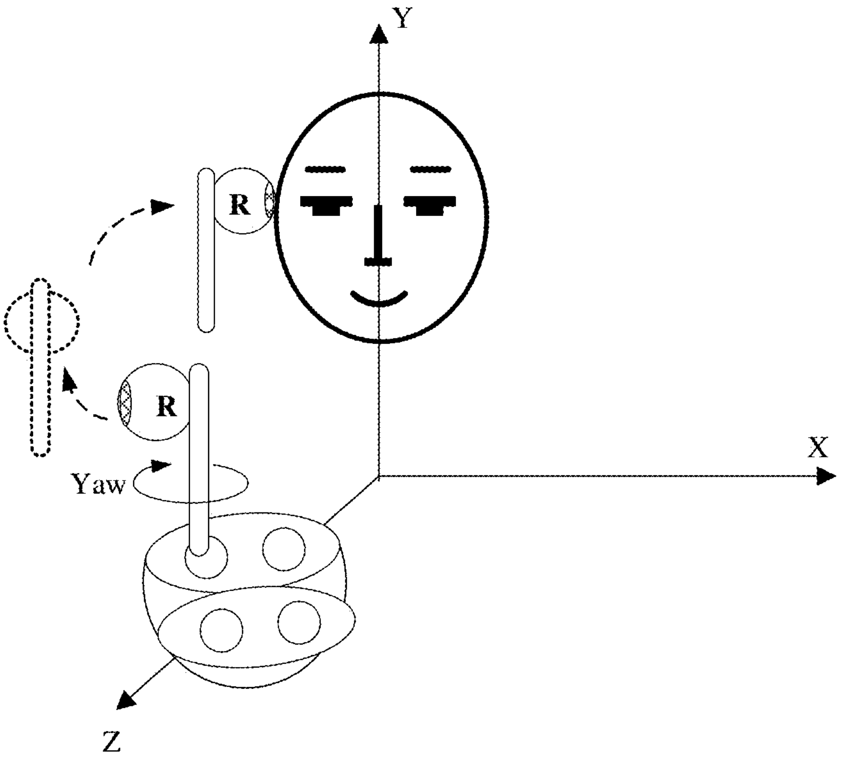

FIG. 6B and FIG. 6C show examples of an earbud motion generated in a process in which the user correctly wears the earbud in a case shown in FIG. 6A. In the process of wearing the earbud shown in FIG. 6B, the right bud may detect that the right bud rotates around the Y-axis anticlockwise by 180°. Because the orientation of the earbud mouth of the right bud is not opposite to the orientation of the right ear of the user, the user needs to rotate the right bud by half a circle, so as to adjust the orientation of the earbud mouth of the right bud to be opposite to the orientation of the right ear of the user. In the process of wearing the earbud shown in FIG. 6C, the right bud may detect that the right bud rotates around the Y-axis clockwise by 180°.

Figure 6D:
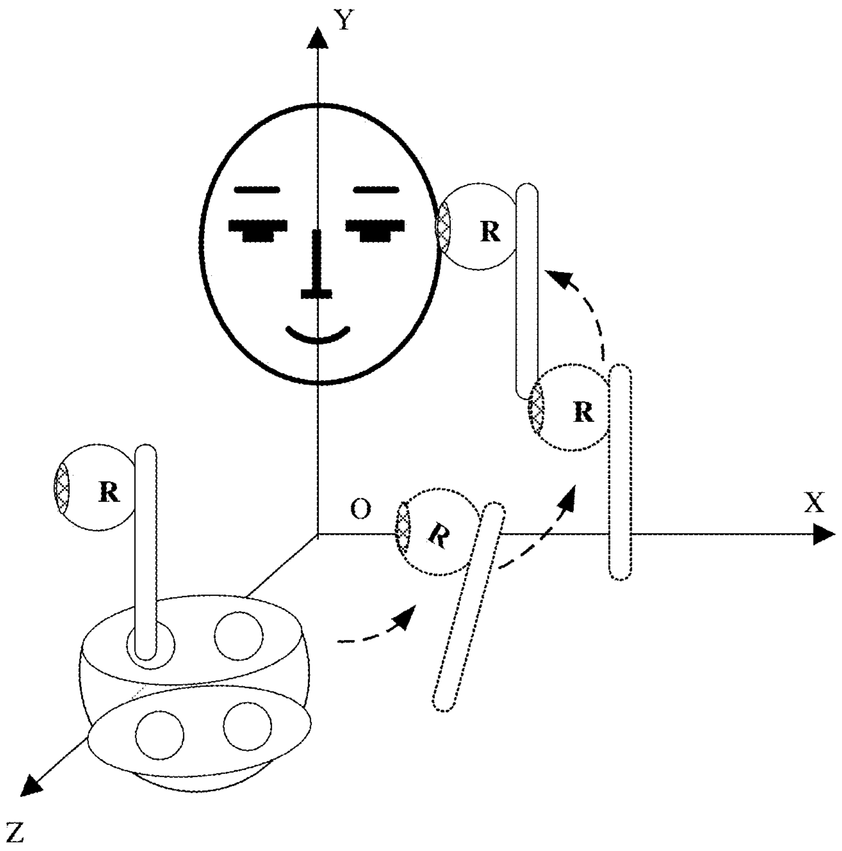

FIG. 6D shows an example of an earbud motion generated in a process in which the user incorrectly wears the earbud in a case shown in FIG. 6A. In the process of wearing the earbud shown in FIG. 6D, the right bud may detect that a rotation angle of the right bud around the Y-axis is very small (close to 0°). Because the orientation of the earbud mouth of the right bud is opposite to the orientation of the left ear of the user, the user may align and wear the right bud on the right ear without adjusting the orientation of the earbud mouth.

It can be learned from FIG. 6A to FIG. 6D that, for the right bud with the initial posture shown in FIG. 6A, an action of correctly wearing the earbud is different from an action of incorrectly wearing the earbud, for example, rotation angles around the Y-axis are different. In this way, the action of incorrectly wearing the earbud can be distinguished.

Based on the rotation value (for example, the rotation value around the Y-axis) detected by a gyroscope, more earbud motion features may be further combined, for example, a movement value of the earbud (for example, an acceleration and displacement) detected by using an accelerometer or the like, so as to describe an earbud wearing action more accurately. Certainly, the movement value may also be independently used to identify whether the earbud is incorrectly worn, and may be specifically implemented by limiting a movement direction and a movement distance. The following still uses the wearing process shown in FIG. 5A to FIG. 5D and FIG. 6A to FIG. 6D as an example for description.

FIG. 5B shows an example of an earbud motion generated in a process in which the user correctly wears the earbud in a case shown in FIG. 5A. A movement value generated by the right bud relative to a start position (coordinates may be defined as (0, 0, 0)) may be represented by using a motion data combination (X−, Y+, Z−). "X−" indicates that the right bud moves on a negative direction of the X-axis, and indicates that the right bud moves close to the right ear on the X-axis, that is, moves towards a right side of the face; "Y+" indicates that the right bud moves on a positive direction of the Y-axis, and indicates that the right bud is picked up upward; and "Z−" indicates that the right bud moves on a negative direction of the Z-axis, and indicates that the right bud is taken close to the user.

FIG. 5C and FIG. 5D show examples of an earbud motion generated in a process in which the user incorrectly wears the earbud in a case shown in FIG. 5A. In the process of wearing the earbud shown in FIG. 5C, a movement value generated by the right bud relative to a start position (coordinates may be defined as (0, 0, 0)) may be represented by using a motion data combination (X+, Y+, Z−). "X+" indicates that the right bud moves on a positive direction of the X-axis, and indicates that the right bud moves close to the left ear on the X-axis, that is, moves towards a left side of the face; "Y+" indicates that the right bud moves on a positive direction of the Y-axis, and indicates that the right bud is picked up upward; and "Z−" indicates that the right bud moves on a negative direction of the Z-axis, and indicates that the right bud is taken close to the user. In the process of wearing the earbud shown in FIG. 5D, a movement value generated by the right bud relative to a start position may also be represented by using a motion data combination (X+, Y+, Z−).

FIG. 6B and FIG. 6C show examples of an earbud motion generated in a process in which the user correctly wears the earbud in a case shown in FIG. 6A. In the process of wearing the earbud shown in FIG. 6B, a movement value generated by the right bud relative to a start position (coordinates may be defined as (0, 0, 0)) may be represented by using a motion data combination (X−, Y+, Z−). "X−" indicates that the right bud moves on a negative direction of the X-axis, and indicates that the right bud moves close to the right ear on the X-axis, that is, moves towards a right side of the face; "Y+" indicates that the right bud moves on a positive direction of the Y-axis, and indicates that the right bud is picked up upward; and "Z−" indicates that the right bud moves on a negative direction of the Z-axis, and indicates that the right bud is taken close to the user. In the process of wearing the earbud shown in FIG. 6C, an earbud motion detected by the right bud may also be represented by using a motion data combination (X−, Y+, Z−).

FIG. 6D shows an example of an earbud motion generated in a process in which the user incorrectly wears the earbud in a case shown in FIG. 6A. A movement value generated by the right bud relative to a start position (coordinates may be defined as (0, 0, 0)) may be represented by using a motion data combination (X+, Y+, Z−). "X+" indicates that the right bud moves on a positive direction of the X-axis, and indicates that the right bud moves close to the left ear on the X-axis, that is, moves towards a left side of the face; "Y+" indicates that the right bud moves on a positive direction of the Y-axis, and indicates that the right bud is picked up upward; and "Z−" indicates that the right bud moves on a negative direction of the Z-axis, and indicates that the right bud is taken close to the user.

The foregoing motion data combinations including movement values on the X, Y, and Z axes need to be calculated by using a detection value of an acceleration sensor in the right bud when an initial posture of the right bud relative to the user is known. If a first earbud has a plurality of initial postures relative to the user, for example, a plurality of possible cases such as FIG. 5A and FIG. 6A, whether the earbud is incorrectly worn is determined based on rotation detected by the gyroscope, which can be implemented also when the initial posture of the right bud relative to the user is known. To know the initial posture of the right bud relative to the user, an implementation is that the user may determine, on an electronic device (such as a mobile phone) that the earbud communicates with, an initial posture of the earbud, that is, a posture of the earbud formed when the earbud is taken out from the earbud case, for example, an orientation of the earbud mouth relative to the user. In another implementation, the initial posture may be determined based on a posture in which the earbud case is held by the user. For example, a recommended holding posture of the earbud case is usually convenient for the user to take and use the earbud, and a case shown in FIG. 5A is provided.

In the technical solution provided in this embodiment of this application, whether the earbud is incorrectly worn may also be identified for a default initial posture (as shown in FIG. 5A or FIG. 6A). This is very applicable to a scenario in which initial postures of the left bud and the right bud are fixed. For example, the left bud and the right bud are stored in an earbud case integrated into a smartwatch. Each time the user lifts a wrist to take and use the earbud, the initial postures of the left bud and the right bud are fixed relative to the user. For example, it is assumed that the default initial posture is shown in FIG. 5A. If it is detected that the rotation angle of the right bud is about 180°, it may be determined that the right bud is incorrectly worn. Optionally, whether the earbud is incorrectly worn may be determined based on displacement. For example, in consideration of a normal use situation of the user, a direction in which an opening of the earbud case faces the user is used as a default initial position of the earbud. The earbud stores displacement of the earbud from being normally taken out from the earbud case to be worn on a corresponding ear, and whether the earbud is correctly worn is determined based on the displacement.

An event that the earbud is taken out from the earbud case may be determined by detecting separation between the earbud and a charging metal part in the earbud case, or may be determined by detecting a motion posture. As described above, motion data (such as a rotation angle, displacement, and an acceleration) collected by sensors such as a gyroscope and an accelerometer during a period from taking the earbud out from the earbud case to wearing the earbud on the ear of the user can be used to describe the action of the user wearing the earbud, to identify, based on this, whether the earbud is incorrectly worn.

After the earbud is worn on the ear of the user, the earbud may move with a head action of the user, to generate the earbud motion. For example, after wearing the earbud, the user places the earbud case with his head down, and the earbud motion is generated for the earbud with a head motion of lowering the head. These earbud motions that are generated along with the head action of the user may be used to further calibrate a determining result of whether the earbud is incorrectly worn.

2. Worn Earbud Motion

After the earbud is worn, the motion data (such as a rotation angle, displacement, and an acceleration) collected by sensors such as a gyroscope and an accelerometer in the earbud may be used to determine the earbud motion, to calibrate a preliminary result of determining whether the earbud is incorrectly worn based on the "wearing earbud motion", thereby further improving accuracy.

With reference to FIG. 7A and FIG. 7B, FIG. 8A and FIG. 8B, FIG. 9A and FIG. 9B, FIG. 10A and FIG. 10B, FIG. 11A and FIG. 11B, and FIG. 12A and FIG. 12B, the following uses the right bud as an example to compare worn earbud motions (which are generated with a plurality of head motions) generated when the earbud is incorrectly worn or the earbud is correctly worn. A coordinate system O-XHYHZH is a carrier coordinate system of a human head, and coordinate systems O-XaYaZa and O-XbYbZb are carrier coordinate systems of the right bud.

Lean to a Left Shoulder (Roll is a Positive Value)

Figure 7A:
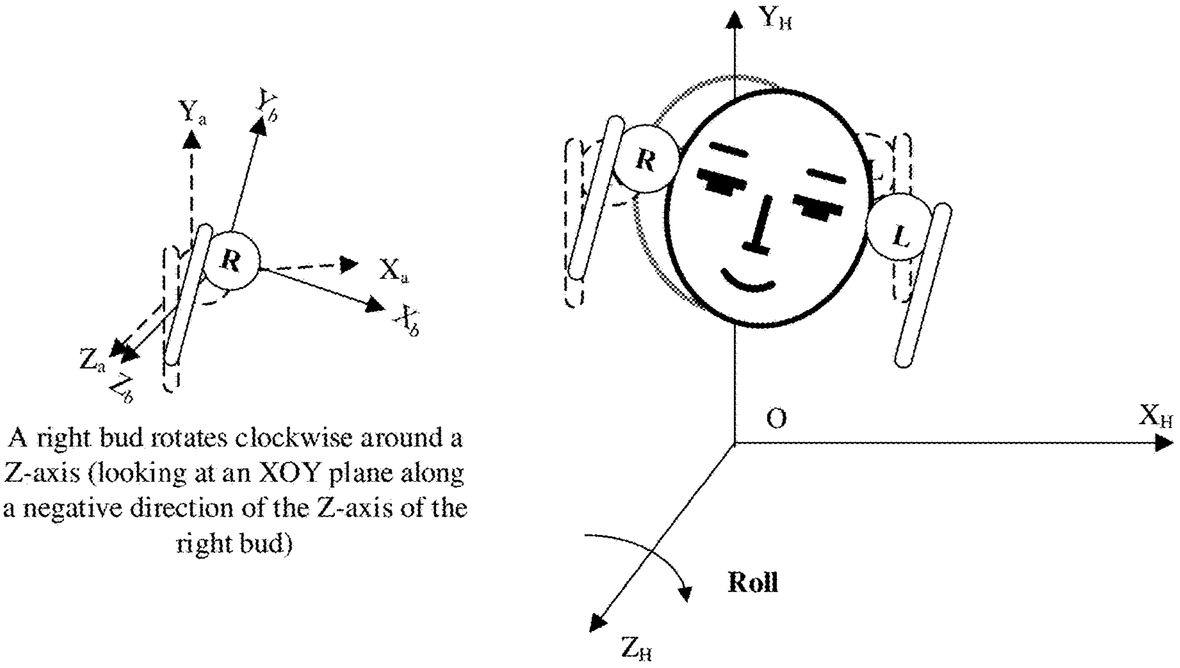
FIG. 7A shows an example of an earbud motion generated with a head action of "leaning to a left shoulder" when a right bud is correctly worn.

FIG. 7A shows an example of an earbud motion generated with a head action of "leaning to a left shoulder" when the right bud is correctly worn. A rotation value detected by the right bud may be represented as "+roll", where "+roll" indicates that the right bud rotates clockwise around the Z-axis of the right bud, and the rotation does not exceed 90°. A movement value generated by the right bud may be represented by using a motion data combination (XH+, YH+, 0). "XH+" indicates that the right bud moves on a positive direction of an XH-axis, and is generated when the right bud worn on the right ear leans to the left shoulder with the head; "YH+" indicates that the right bud moves on a positive direction of a YH-axis, and is generated when the right bud worn on the right ear leans to the left shoulder with the head; and "0" indicates that displacement generated by the right bud on a ZH-axis is very small (close to 0), because the head does not move significantly on the ZH-axis when the head leans to the left shoulder.

Figure 7B:
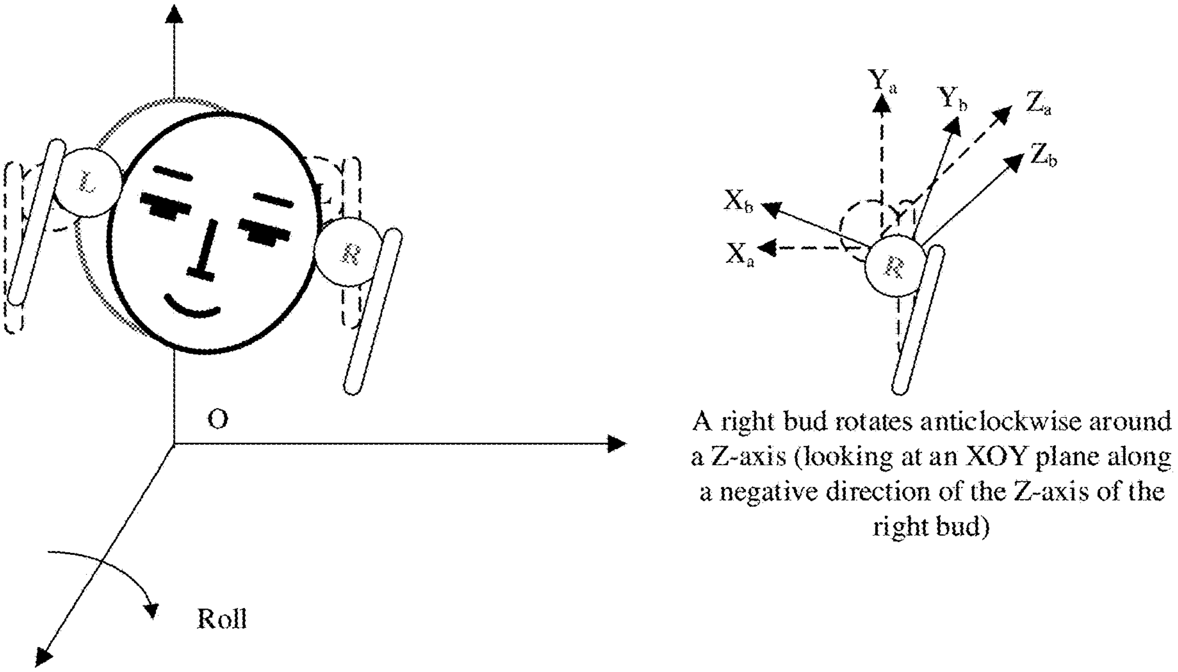
FIG. 7B shows an example of an earbud motion generated with a head action of "leaning to a left shoulder" when a right bud is incorrectly worn.

FIG. 7B shows an example of an earbud motion generated with a head action of "leaning to a left shoulder" when the right bud is incorrectly worn. A rotation value detected by the right bud may be represented as "−roll", where "−roll" indicates that the right bud rotates anticlockwise around the Z-axis of the right bud, and the rotation does not exceed 90°. A movement value generated by the right bud may be represented by using a motion data combination (XH+, YH−, 0). "XH+" indicates that the right bud moves on a positive direction of an XH-axis, and is generated when the right bud worn on the left ear leans to the left shoulder with the head; "YH−" indicates that the right bud moves on a negative direction of a YH-axis, and is generated when the right bud worn on the left ear leans to the left shoulder with the head; and "0" indicates that displacement generated by the right bud on a ZH-axis is very small (close to 0).

Lean to a Right Shoulder (Roll is a Negative Value)

Figure 8A:
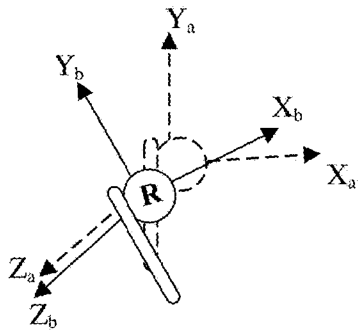
FIG. 8A shows an example of an earbud motion generated with a head action of "leaning to a right shoulder" when a right bud is correctly worn.
Figure 8A:
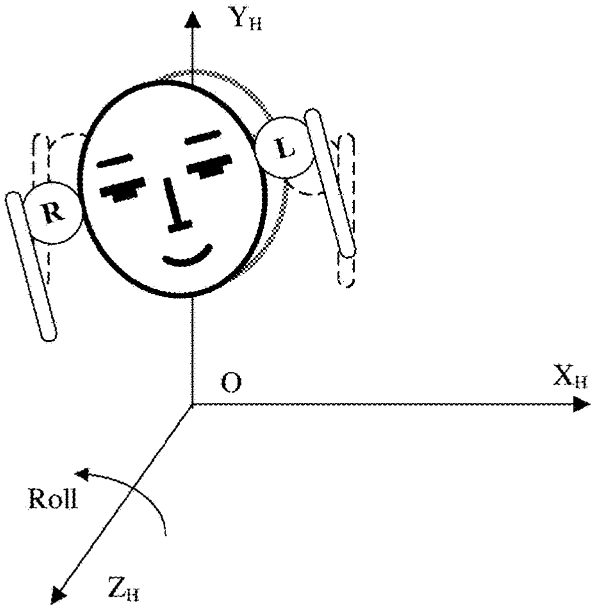

FIG. 8A shows an example of an earbud motion generated with a head action of "leaning to a right shoulder" when the right bud is correctly worn. A rotation value detected by the right bud may be represented as "−roll", where "−roll" indicates that the right bud rotates anticlockwise around the Z-axis of the right bud, and the rotation does not exceed 90°. A movement value generated by the right bud may be represented by using a motion data combination (XH−, YH−, 0). "XH−" indicates that the right bud moves on a negative direction of an XH-axis, and is generated when the right bud worn on the right ear leans to the right shoulder with the head; "YH−" indicates that the right bud moves on a negative direction of a YH-axis, and is generated when the right bud worn on the right ear leans to the right shoulder with the head; and "0" indicates that displacement generated by the right bud on a ZH-axis is very small (close to 0), because the head does not move significantly on the ZH-axis when the head leans to the right shoulder.

Figure 8B:
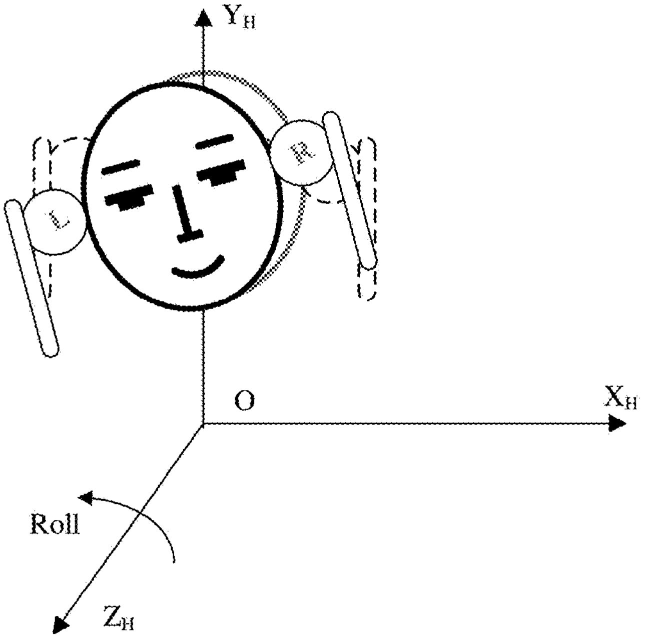
FIG. 8B shows an example of an earbud motion generated with a head action of "leaning to a right shoulder" when a right bud is incorrectly worn.
Figure 8B:
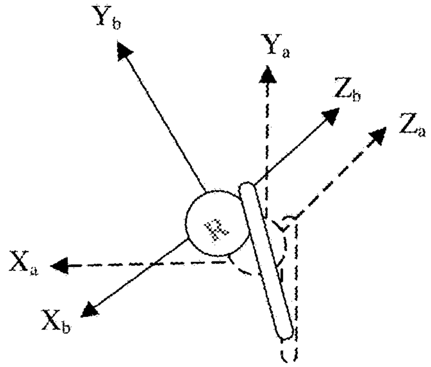

FIG. 8B shows an example of an earbud motion generated with a head action of "leaning to a right shoulder" when the right bud is incorrectly worn. A rotation value detected by the right bud may be represented as "+roll", where "+roll" indicates that the right bud rotates clockwise around the Z-axis of the right bud, and the rotation does not exceed 90°. A movement value generated by the right bud may be represented by using a motion data combination (XH−, YH+, 0). "XH−" indicates that the right bud moves on a negative direction of an XH-axis, and is generated when the right bud worn on the right ear leans to the right shoulder with the head; "YH+" indicates that the right bud moves on a positive direction of a YH-axis, and is generated when the right bud worn on the right ear leans to the right shoulder with the head; and "0" indicates that displacement generated by the right bud on a ZH-axis is very small (close to 0).

Turn the Head Leftwards (Yaw is a Negative Value)

Figure 9A:
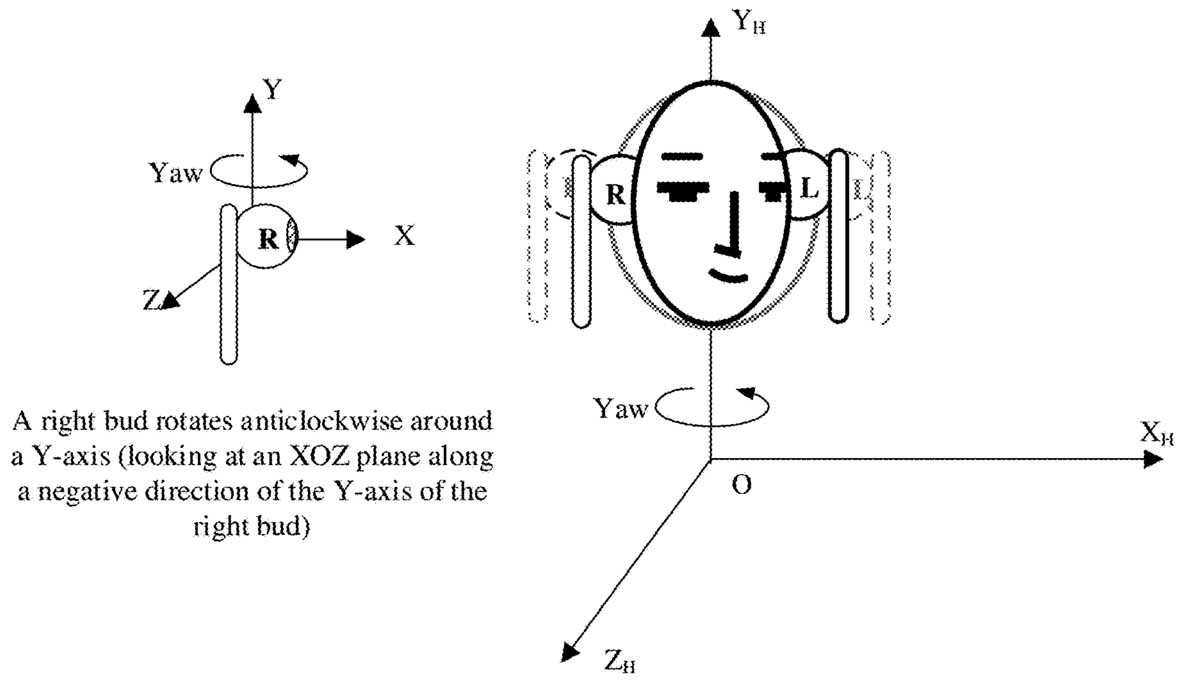
FIG. 9A shows an example of an earbud motion generated with a head action of "turning a head leftwards" when a right bud is correctly worn.

FIG. 9A shows an example of an earbud motion generated with a head action of "turning the head leftwards" when the right bud is correctly worn. A rotation value detected by the right bud may be represented as "−yaw", where "−yaw" indicates that the right bud rotates anticlockwise around the Y-axis of the right bud, and the rotation does not exceed 90°. A movement value generated by the right bud may be represented by using a motion data combination (XH+, 0, ZH+). "XH+" indicates that the right bud moves on a positive direction of an XH-axis, and is generated when the right bud worn on the right ear turns leftwards with the head; "0" indicates that displacement generated by the right bud on a YH-axis is very small (close to 0), because the head does not move significantly on the YH-axis when turning the head leftwards; and "ZH+" indicates that the right bud moves on a positive direction of a ZH-axis, and is generated when the right bud worn on the right ear turns leftwards with the head.

Figure 9B:
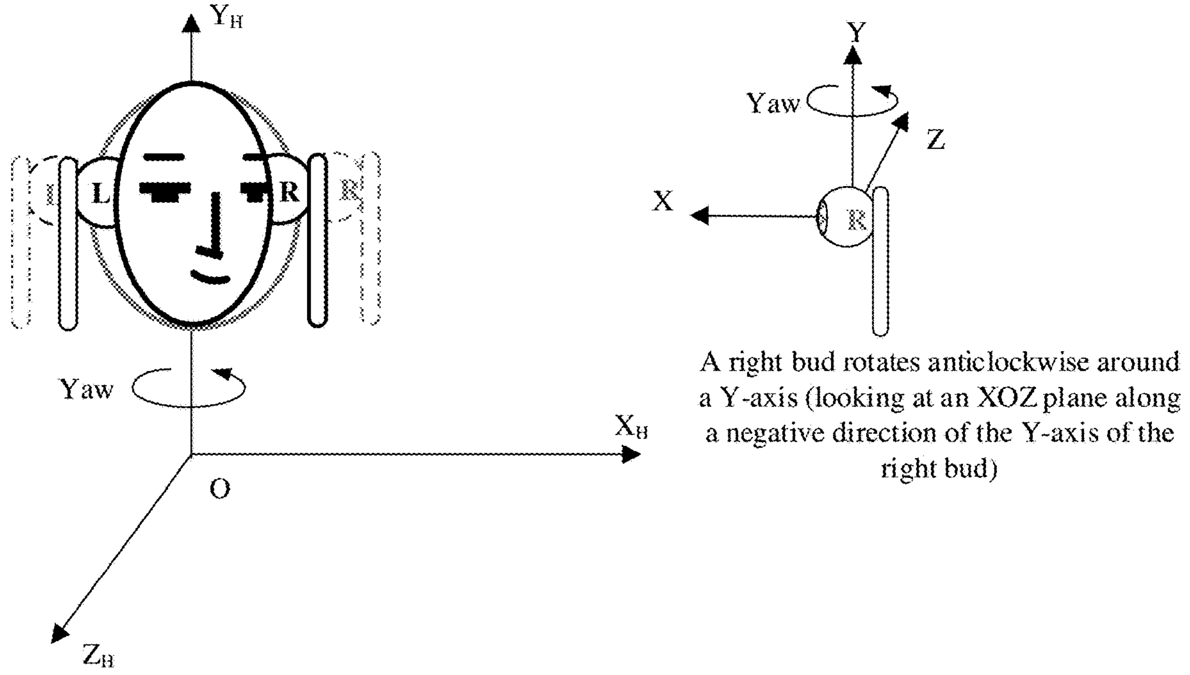
FIG. 9B shows an example of an earbud motion generated with a head action of "turning a head leftwards" when a right bud is incorrectly worn.

FIG. 9B shows an example of an earbud motion generated with a head action of "turning the head leftwards" when the right bud is incorrectly worn. A rotation value detected by the right bud may be represented as "−yaw", where "−yaw" indicates that the right bud rotates anticlockwise around the Y-axis of the right bud, and the rotation does not exceed 90°. A movement value generated by the right bud may be represented by using a motion data combination (XH−, 0, ZH−). "XH−" indicates that the right bud moves on a negative direction of an XH-axis, and is generated when the right bud worn on the left ear turns leftwards with the head; "0" indicates that displacement generated by the right bud on a YH-axis is very small (close to 0); and "ZH−" indicates that the right bud moves on a negative direction of a ZH-axis, and is generated when the right bud worn on the left ear turns leftwards with the head.

Turn the Head Rightwards (Yaw is a Positive Value)

Figure 10A:
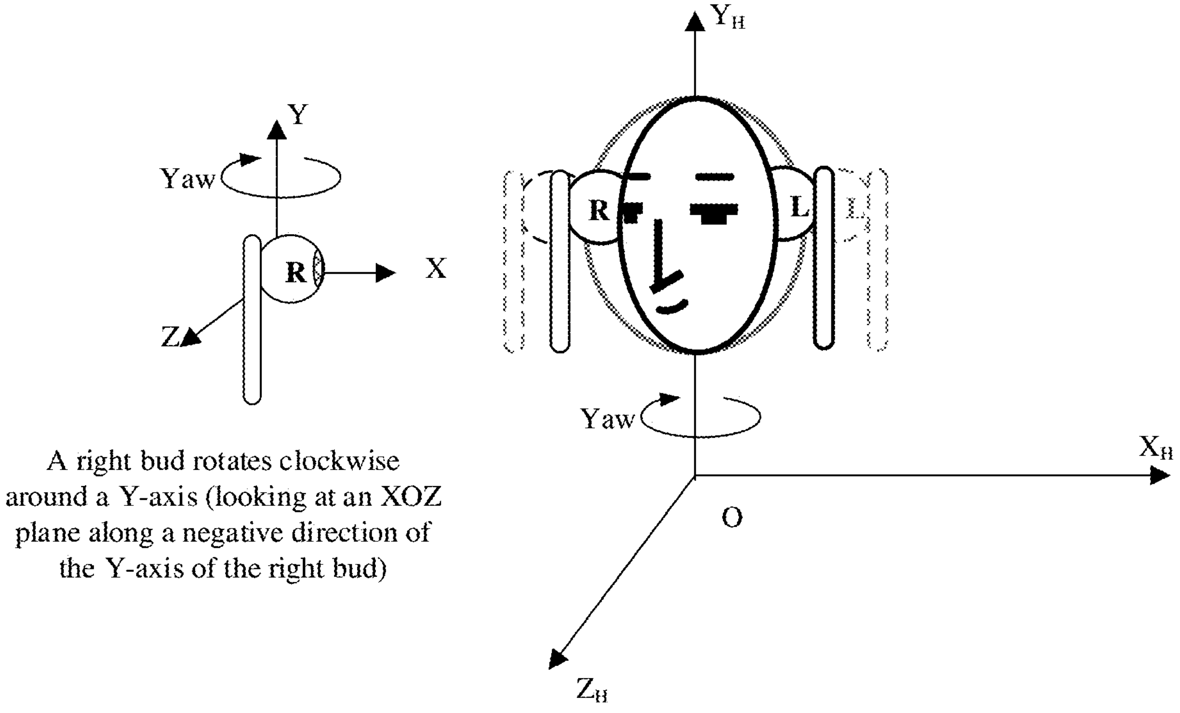
FIG. 10A shows an example of an earbud motion generated with a head action of "turning a head rightwards" when a right bud is correctly worn.

FIG. 10A shows an example of an earbud motion generated with a head action of "turning the head rightwards" when the right bud is correctly worn. A rotation value detected by the right bud may be represented as "+yaw", where "+yaw" indicates that the right bud rotates clockwise around the Y-axis of the right bud, and the rotation does not exceed 90°. A movement value generated by the right bud may be represented by using a motion data combination (XH+, 0, ZH−). "XH+" indicates that the right bud moves on a positive direction of an XH-axis, and is generated when the right bud worn on the right ear turns leftwards with the head; "0" indicates that displacement generated by the right bud on a YH-axis is very small (close to 0), because the head does not move significantly on the YH-axis when turning the head rightwards; and "ZH−" indicates that the right bud moves on a negative direction of a ZH-axis, and is generated when the right bud worn on the right ear turns leftwards with the head.

Figure 10B:
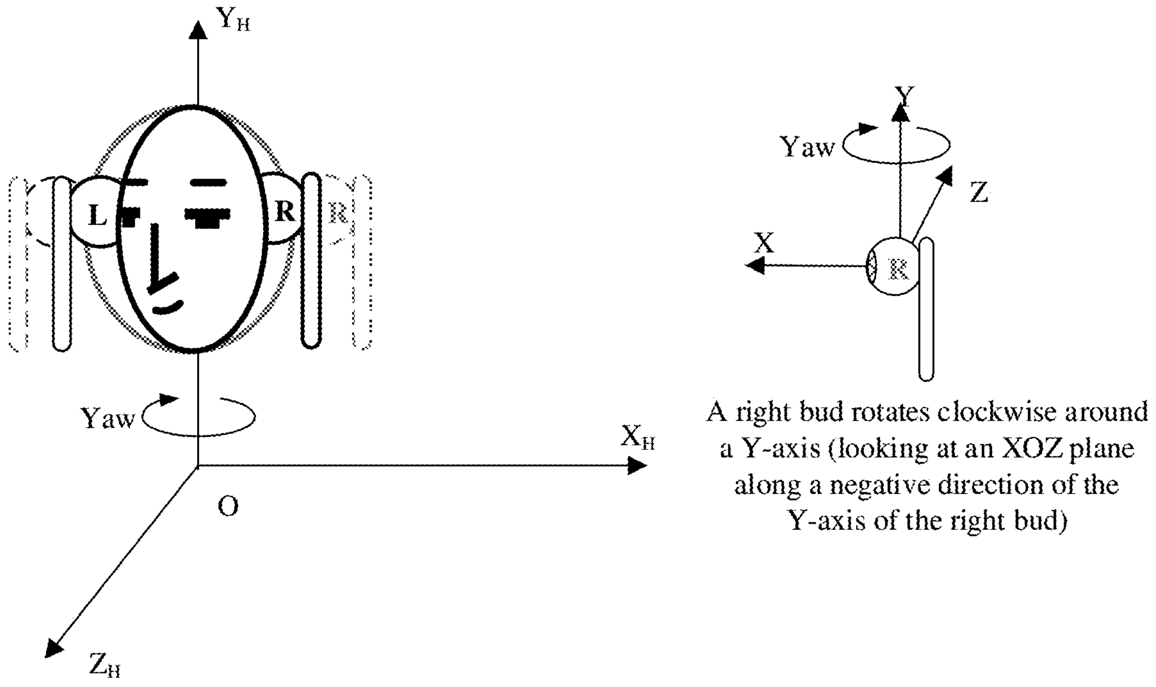
FIG. 10B shows an example of an earbud motion generated with a head action of "turning a head rightwards" when a right bud is incorrectly worn.

FIG. 10B shows an example of an earbud motion generated with a head action of "turning the head rightwards" when the right bud is incorrectly worn. A rotation value detected by the right bud may be represented as "+yaw", where "+yaw" indicates that the right bud rotates clockwise around the Y-axis of the right bud, and the rotation does not exceed 90°. A movement value generated by the right bud may be represented by using a motion data combination (XH−, 0, ZH+). "XH−" indicates that the right bud moves on a negative direction of an XH-axis, and is generated when the right bud worn on the left ear turns leftwards with the head; "0" indicates that displacement generated by the right bud on a YH-axis is very small (close to 0); and "ZH+" indicates that the right bud moves on a positive direction of a ZH-axis, and is generated when the right bud worn on the left ear turns leftwards with the head.

Turn the Head Upwards (Pitch is a Positive Value, or is Referred to as Falling the Head Backwards)

Figure 11A:
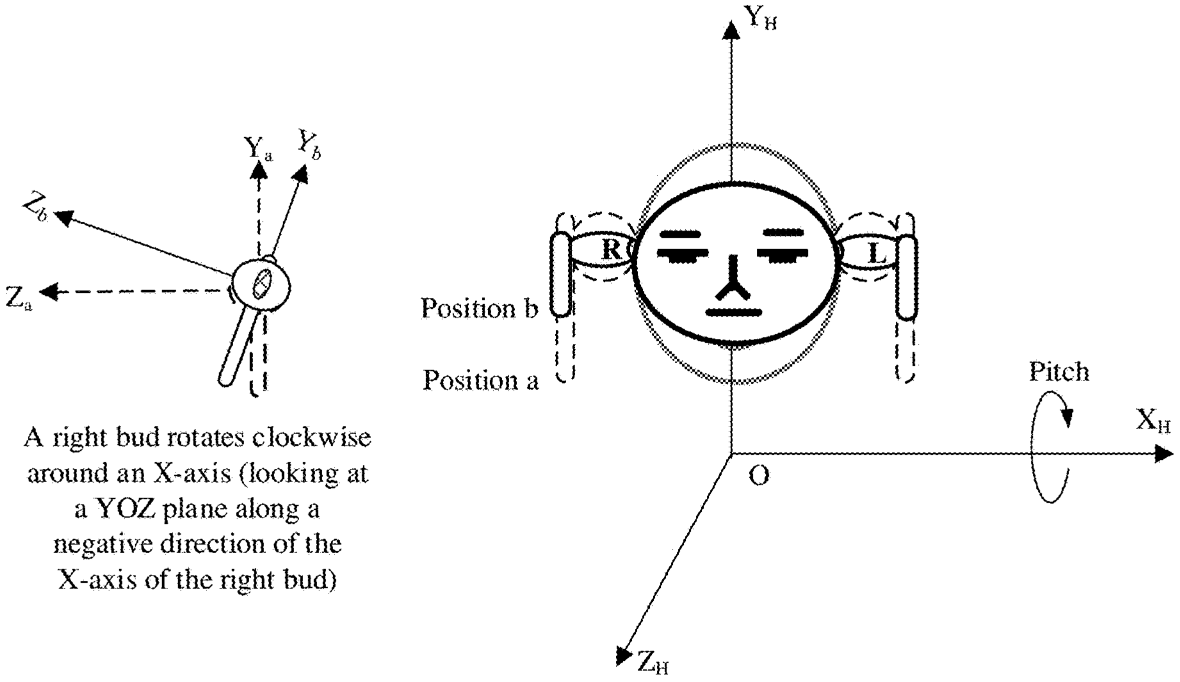
FIG. 11A shows an example of an earbud motion generated with a head action of "turning a head upwards" when a right bud is correctly worn.

FIG. 11A shows an example of an earbud motion generated with a head action of "turning the head upwards" when the right bud is correctly worn. A rotation value detected by the right bud may be represented as "+pitch", where "+pitch" indicates that the right bud rotates clockwise around the X-axis, and the rotation does not exceed 90°. A movement value generated by the right bud may be represented by using a motion data combination (0, YH+, ZH−). "0" indicates that displacement generated by the right bud on an XH-axis is very small (close to 0), because the head does not move significantly on the XH-axis when turning the head upwards; "YH+" indicates that the right bud moves on a positive direction of a YH-axis, and is generated when the right bud worn on the right ear turns upwards with the head; and "ZH−" indicates that the right bud moves on a negative direction of a ZH-axis, and is generated when the right bud worn on the right ear turns upwards with the head.

Figure 11B:
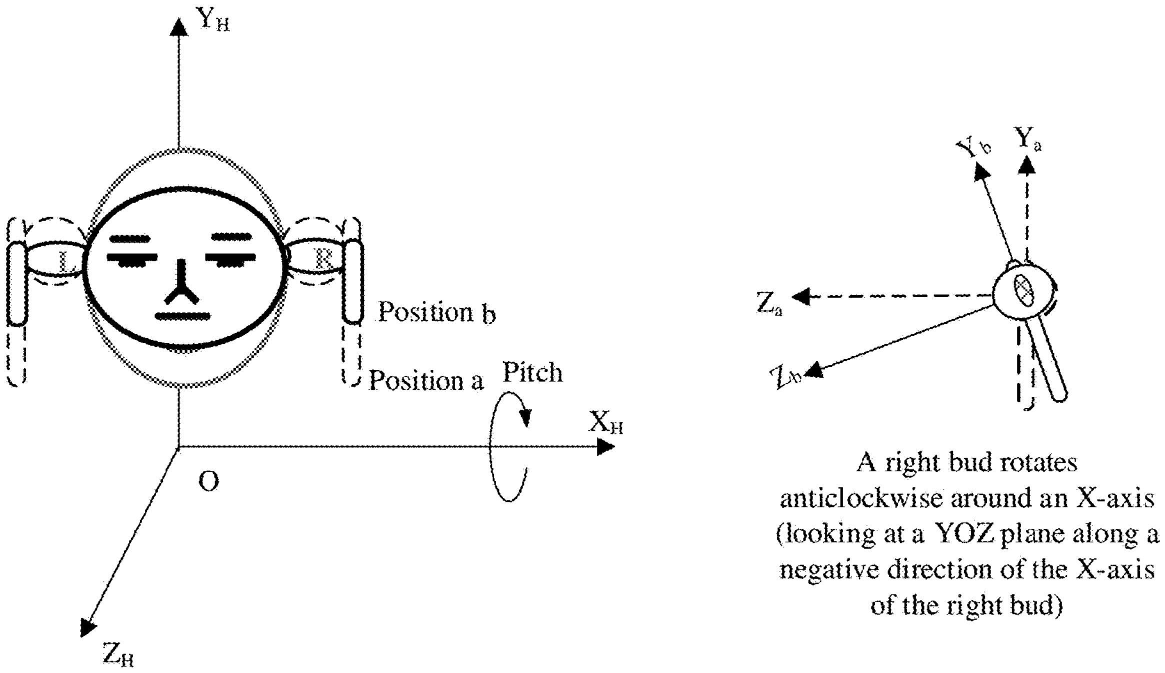
FIG. 11B shows an example of an earbud motion generated with a head action of "turning a head upwards" when a right bud is incorrectly worn.

FIG. 11B shows an example of an earbud motion generated with a head action of "turning the head upwards" when the right bud is incorrectly worn. A rotation value detected by the right bud may be represented as "−pitch", where "−pitch" indicates that the right bud rotates anticlockwise around the X-axis, and the rotation does not exceed 90°. A movement value generated by the right bud may also be represented by using a motion data combination (o, YH+, ZH−).

Turn the Head Downwards (Pitch is a Negative Value, or is Referred to as Lowering the Head)

Figure 12A:
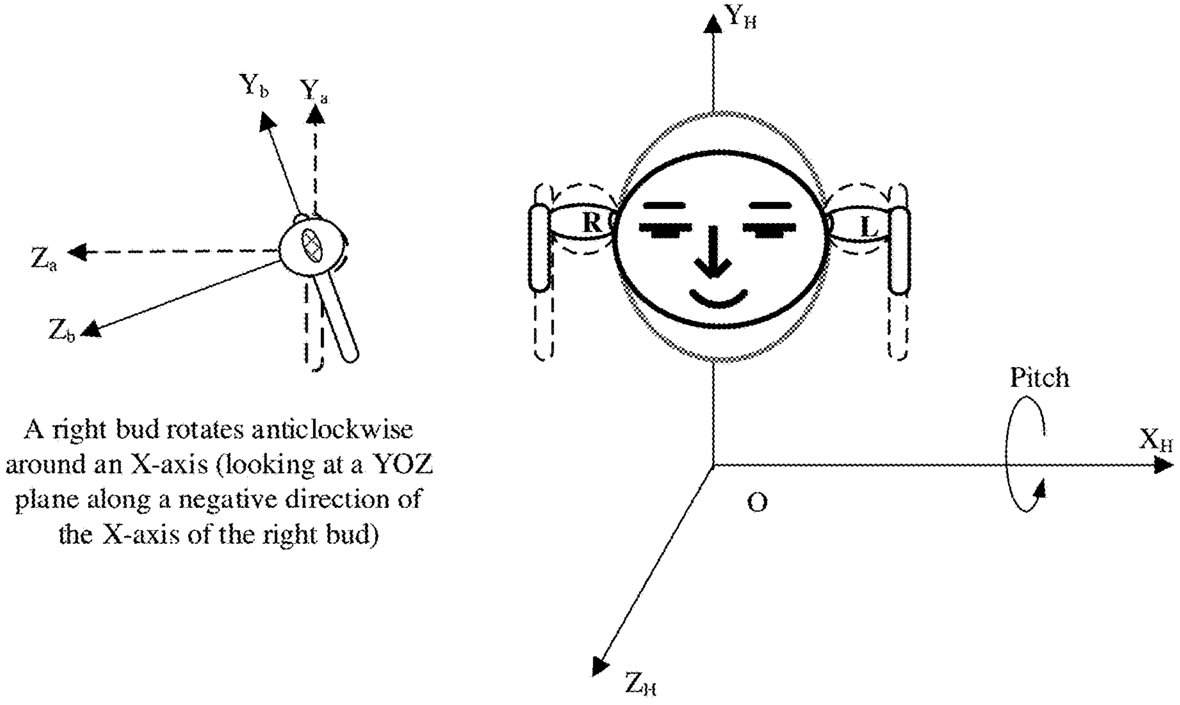
FIG. 12A shows an example of an earbud motion generated with a head action of "turning a head downwards" when a right bud is correctly worn.

FIG. 12A shows an example of an earbud motion generated with a head action of "turning the head downwards" when the right bud is correctly worn. A rotation value detected by the right bud may be represented as "−pitch", where "−pitch" indicates that the right bud rotates anticlockwise around the X-axis, and the rotation does not exceed 90°. A movement value generated by the right bud may be represented by using a motion data combination (o, YH−, ZH+). "0" indicates that displacement generated by the right bud on an XH-axis is very small (close to 0), because the head does not move significantly on the XH-axis when turning the head downwards; "YH−" indicates that the right bud moves on a negative direction of a YH-axis, and is generated when the right bud worn on the right ear turns downwards with the head; and "ZH+" indicates that the right bud moves on a positive direction of a ZH-axis, and is generated when the right bud worn on the right ear turns downwards with the head.

Figure 12B:
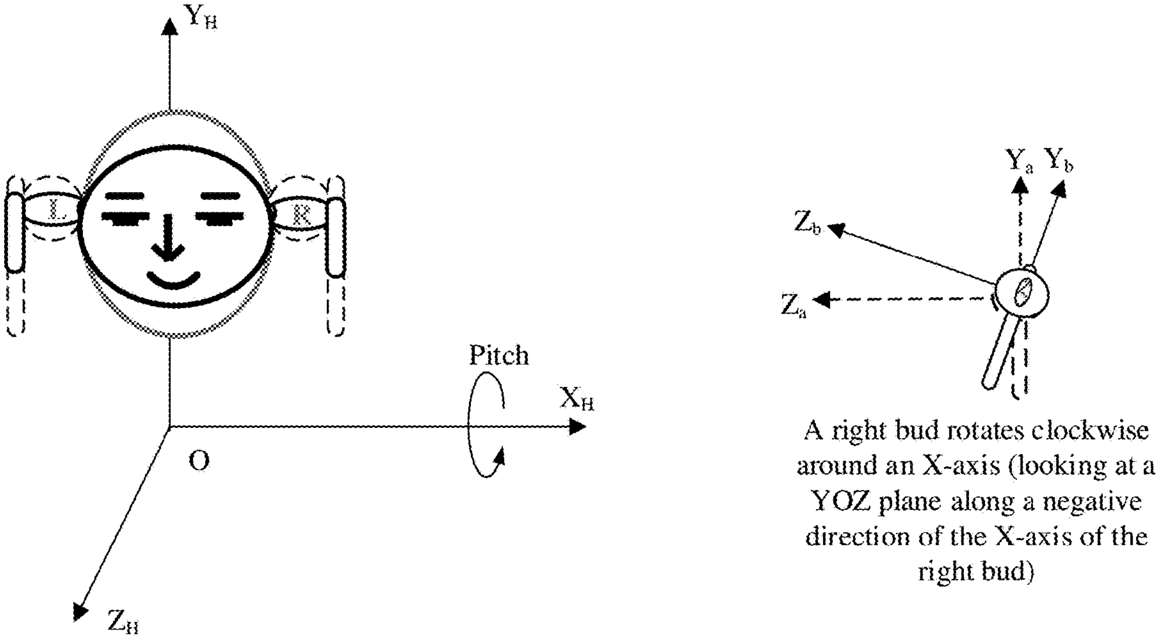
FIG. 12B shows an example of an earbud motion generated with a head action of "turning a head downwards" when a right bud is incorrectly worn.

FIG. 12B shows an example of an earbud motion generated with a head action of "turning the head downwards" when the right bud is incorrectly worn. A rotation value detected by the right bud may be represented as "−pitch", where "−pitch" indicates that the right bud rotates anticlockwise around the X-axis, and the rotation does not exceed 90°. A movement value generated by the right bud may also be represented by using a motion data combination (0, YH−, ZH+).

Based on a preliminary determining result of whether the earbud is incorrectly worn, the foregoing motion data combinations formed by movement values on an XHYHZH-axis may be calculated by using a detection value of the acceleration sensor in the right bud. The preliminary determining result may be used to determine an orientation of an earbud mouth of the right bud. That is, if the preliminary determining result is that the right bud is correctly worn, the earbud mouth of the right bud faces the right ear of the user, that is, faces a positive direction of XH; and otherwise, the earbud mouth of the right bud faces the left ear of the user, that is, faces a negative direction of XH.

A rotation value (a roll, yaw, and pitch value) detected by the gyroscope and the movement value on XHYHZH detected by the accelerometer may be used to help further calibrate whether the earbud is incorrectly worn. It is assumed that the preliminary determining result of whether the earbud is incorrectly worn is that the earbud is incorrectly worn. In this case, if motion data detected after the earbud is worn meets a feature of the motion data combination in FIG. 7B, FIG. 8B, FIG. 9B, FIG. 10B, FIG. 11B, or FIG. 12B, it indicates that the preliminary determining result is accurate, and it may be further determined that the earbud is incorrectly worn. On the contrary, if the motion data detected after the earbud is worn meets a feature of the motion data combination in FIG. 7A, FIG. 8A, FIG. 9A, FIG. 10A, FIG. 11A, or FIG. 12A, it indicates that the preliminary determining result is inaccurate. This is not limited to a combination with a solution of preliminarily determining whether the earbud is incorrectly worn based on a wearing earbud motion, and whether the earbud is incorrectly worn may also be identified based on only a worn earbud motion. If the worn earbud motion of the right bud, for example, earbud rotation and earbud displacement is consistent with the earbud motion that is generated after the right bud is incorrectly worn and that is shown in the example of FIG. 7B, FIG. 8B, FIG. 9B, FIG. 10B, FIG. 11B, or FIG. 12B, it may be determined that the right bud is incorrectly worn on the left ear of the user.

This is not limited to the foregoing several typical head motions, and another head motion may also be used to calibrate a determining result of whether the earbud is incorrectly worn.

Figure 13:
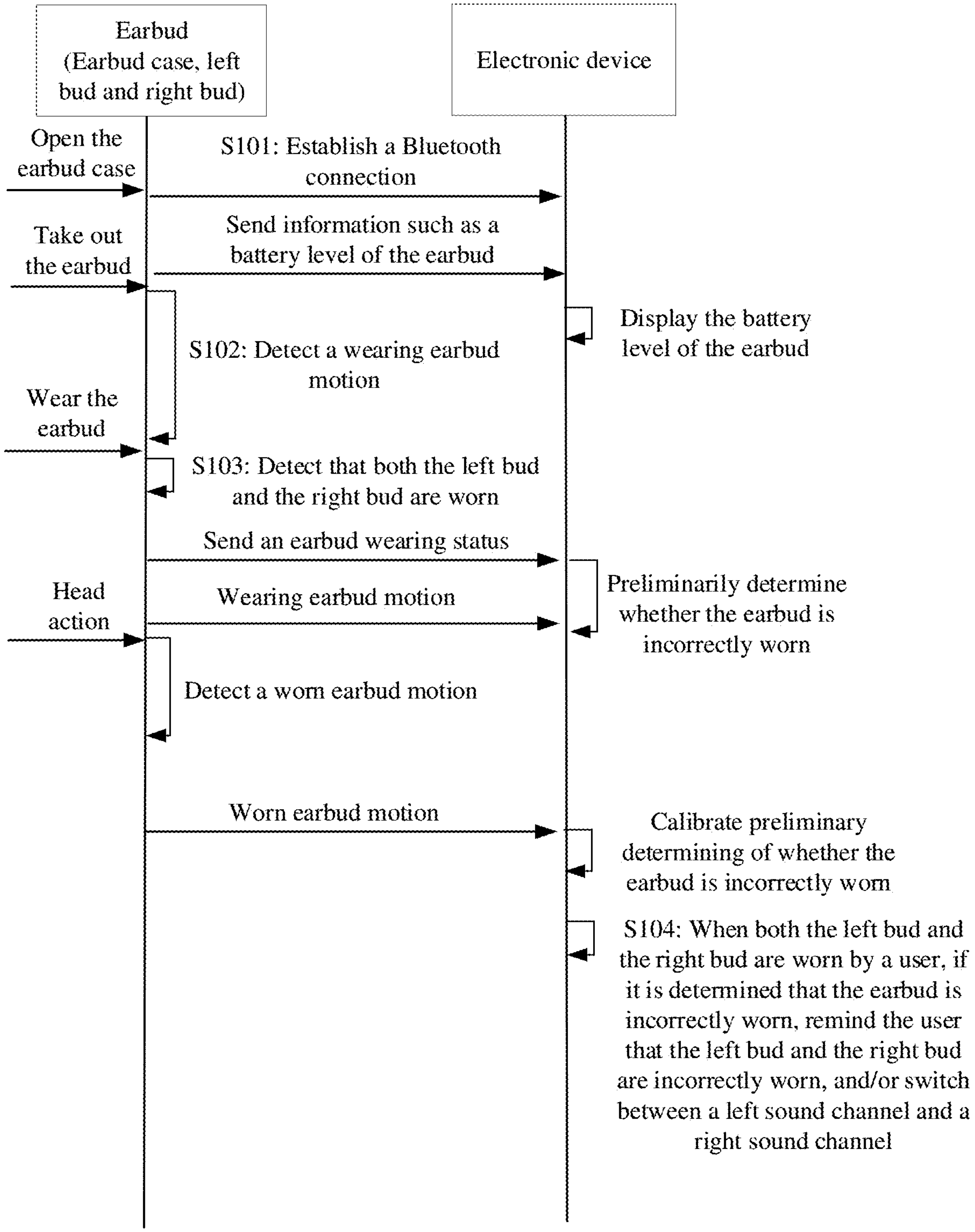
FIG. 13 shows an example of an overall procedure of a method for identifying an earbud wearing error according to an embodiment of this application.

Based on the foregoing embodiment of determining, through the earbud motion, whether the earbud is incorrectly worn, the following describes, with reference to FIG. 13, an overall procedure of a method for identifying an earbud wearing error provided in the embodiments of this application.

S101: An electronic device establishes a Bluetooth communications connection to an earbud.

The electronic device and the earbud may exchange audio data, a play control message, a call control message, and the like based on the Bluetooth communications connection. The earbud may further transmit device status information such as a battery level to the electronic device through the Bluetooth communications connection. In this way, the electronic device may display a device status such as the battery level of the earbud, so that the user can learn an earbud status. This is not limited to the Bluetooth communications connection. The connection established between the electronic device and the earbud may also be another communications connection, for example, a Wi-Fi direct connection, a cellular mobile communications connection, or the like.

The electronic device may separately establish a communications connection to the left bud and the right bud, and separately transmit audio data of a left sound channel and a right sound channel to the left bud and the right bud. Alternatively, the electronic device may establish a communications connection to only one of the earbuds, and the electronic device may transmit the audio data of both the left sound channel and the right sound channel to the earbud. For example, as for the left bud, the left bud plays a role of audio data forwarding ("routing"), and the left bud separates audio data of the right sound channel and transmits the audio data of the right sound channel to the right bud.

S102: Detect the earbud motion by using sensors such as a gyroscope and an accelerometer in the earbud, and determine whether the earbud is incorrectly worn based on the earbud motion.

Specifically, the earbud may detect an earbud motion in a period from taking the earbud from an earbud case to wearing the earbud on an ear of the user. The earbud motion (referred to as a "wearing earbud motion" for short) may be used to reflect an action of wearing the earbud by the user, and may be used to preliminarily determine whether the earbud is incorrectly worn. This preliminary determining may be performed by an electronic device (such as a smartphone or a smartwatch) that communicates with the earbud. In this case, when detecting that the earbud is worn by the user, the earbud may send the "wearing earbud motion" to the electronic device. This preliminary determining may also be performed by the earbud.

For how to determine, based on the "wearing earbud motion", whether the earbud is incorrectly worn, refer to the foregoing embodiments in FIG. 5A to FIG. 5D and FIG. 6A to FIG. 6D. Details are not described herein again. For a method for determining whether the left bud is incorrectly worn, refer to a processing manner of the right bud. Details are not described herein again.

S103: Detect, by using a wearing detector (such as an infrared sensor), that both the left bud and the right bud are worn.

S104: When both the left bud and the right bud are worn by the user, if it is preliminarily determined that the earbud is incorrectly worn, the electronic device may display reminders shown in FIG. 14A and FIG. 14B, to remind the user that the left bud and the right bud are incorrectly worn. In this way, the user can manually switch between the left bud and the right bud.

When both the left bud and the right bud are worn by the user, if it is preliminarily determined that the earbud is incorrectly worn, but the user does not manually switch between the left bud and the right bud, the electronic device may automatically switch between the left sound channel and the right sound channel, that is, transmit audio data of the left sound channel to the right bud for playing, and transmit audio data of the right sound channel to the left bud for playing.

Figure 14A:
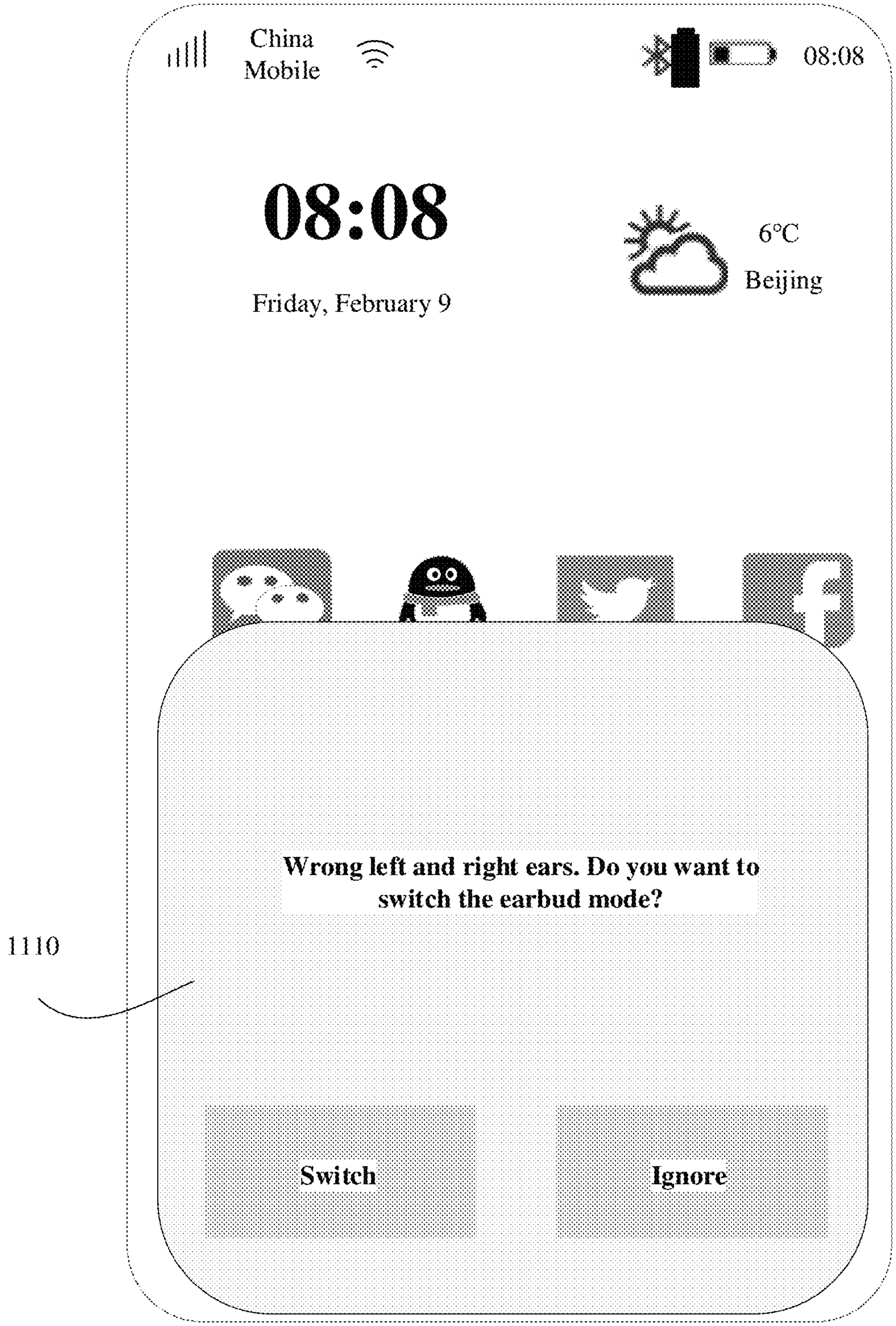
FIG. 14A and FIG. 14B show examples of interface prompts of an earbud wearing error according to an embodiment of this application.
Figure 14B:
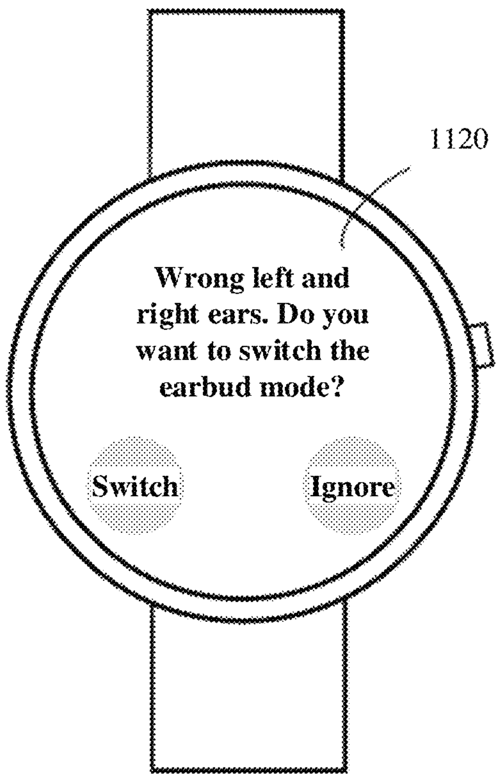

For example, as shown in FIG. 14A and FIG. 14B, the electronic device may further remind the user to switch between the left sound channel and the right sound channel, and may switch between the left sound channel and the right sound channel when it is detected that the user taps a "switch" button. In this way, the user can enjoy a correct audio playing effect of the left sound channel and the right sound channel without manually switching between the left bud and the right bud.

Optionally, the electronic device may directly switch between the left sound channel and the right sound channel without reminding the user that the left bud and the right bud are incorrectly worn, and manually switching between the left bud and the right bud.

When both the left bud and the right bud are worn by the user, if it is preliminarily determined that the earbud is incorrectly worn, a determining result of whether the earbud is incorrectly worn may be further calibrated through a "worn earbud motion". The "worn earbud motion" is generated with a head action of the user. If it is still confirmed that the earbud is incorrectly worn after calibration, the user is reminded to manually switch between the left bud and the right bud, or directly switch between the left sound channel and the right sound channel without manually switching between the left bud and the right bud.

For how to calibrate, based on the "worn earbud motion", the determining result of whether the earbud is incorrectly worn, refer to the foregoing embodiments in FIG. 7A and FIG. 7B, FIG. 8A and FIG. 8B, FIG. 9A and FIG. 9B, FIG. 10A and FIG. 10B, FIG. 11A and FIG. 11B, and FIG. 12A and FIG. 12B. Details are not described herein again.

This is not limited to a combination with a solution of preliminarily determining whether the earbud is incorrectly worn based on a wearing earbud motion, and whether the earbud is incorrectly worn may also be identified based on only a worn earbud motion. If the worn earbud motion of the right bud, for example, earbud rotation and earbud displacement is consistent with the earbud motion that is generated after the right bud is incorrectly worn and that is shown in the example of FIG. 7B, FIG. 8B, FIG. 9B, FIG. 10B, FIG. 11B, or FIG. 12B, it may be determined that the right bud is incorrectly worn on the left ear of the user.

Switching between the left sound channel and the right sound channel may be performed by the electronic device, or may be performed by the earbud. In a case, the electronic device may transmit the audio data of both the left sound channel and the right sound channel to one of the left bud and the right bud. For example, as for the left bud, the left bud plays a role of audio data forwarding ("routing"), and the left bud separates audio data of the right sound channel and transmits the audio data of the right sound channel to the right bud. In this case, the left bud may perform left-right sound channel switching.

According to the method for identifying an earbud wearing error provided in this embodiment of this application, not only a wearing error that occurs in both ears can be identified, a function of switching between the left sound channel and the right sound channel is provided when the wearing error occurs in both ears, and a single-ear wearing error can also be identified. It is also important to identify the single-ear wearing error, so as to avoid a problem that the user wears the earbud uncomfortably.

In addition, the left bud and the right bud can be detected to be incorrectly placed in the earbud case. When the user places the earbud back to the earbud case after using the earbud, the user can determine whether the left bud and the right bud are incorrectly placed. In a case of switching between a left bud mode and a right bud mode when the left bud and the right bud are incorrectly placed, the user does not need to manually switch between a position of the left bud and a position of the right bud, thus avoiding a risk of wearing the earbuds incorrectly when the user takes and uses the left bud and the right bud next time. Optionally, the earbud may send information to the electronic device, and prompt information is displayed on the electronic device to instruct the user to switch the earbuds, or prompt the user whether to control, by using an electronic terminal, the earbud to switch between the left bud mode and the right bud mode.

Herein, mode switching refers to switching between roles of the left bud and the right bud. When the user takes and uses the earbuds again, the left bud becomes the right bud, and the right bud becomes the left bud. The left bud and the right bud each may report a new role to the electronic device when establishing a connection to the electronic device, so that the electronic device distributes audio data of the left sound channel or the right sound channel based on the new role, thereby ensuring that the left sound channel and the right sound channel are correct when the user uses the earbuds next time.

In an implementation, whether the left bud and the right bud are incorrectly placed in the earbud case can be identified by using a charging metal part in the earbud case or the earbud. For example, the earbud case includes a first cavity and a second cavity that respectively accommodate the left bud and the right bud, a charging metal part that is used to charge the right bud by default is disposed in the first cavity, and a charging metal part that is used to charge the left bud by default is disposed in the second cavity. Correspondingly, a first earbud and a second earbud each have a charging metal part, which may be used to contact the charging metal part in a corresponding cavity to obtain charging of the earbud case. The earbud case may read, by using the charging metal part, whether the left bud or the right bud is placed in each cavity, or the earbud may read, by using the charging metal part on the earbud, a cavity in which the earbud is located, so as to determine whether the left bud and the right bud are incorrectly placed. Once it is determined that the earbud is incorrectly placed, the earbud case may communicate with the earbud to switch between the left bud mode and the right bud mode.

Not limited to the charging metal part, a near field communications component, a laser transceiver, an infrared transceiver, and the like may be separately disposed in the first cavity and the second cavity of the earbud case. These components may also be used to detect whether an earbud is placed in the cavity and identify whether the earbud placed in the cavity is the left bud or the right bud. Therefore, these components can also be used to detect whether the earbud is incorrectly placed. Correspondingly, the left bud and the right bud each may also have a charging metal component, a near field communications component, a laser transceiver, an infrared transceiver, and the like, and may communicate with corresponding communications components in the first cavity and the second cavity by using these components, so as to detect whether the earbud is placed in the cavity and identify a cavity in which the earbud is placed. Therefore, these components can also be used to detect whether the earbud is incorrectly placed.

In another implementation, whether the earbud is incorrectly placed in the earbud case may be further identified based on a user action of the user taking off the earbud and placing the earbud back into the earbud case. The user action may be reflected by an earbud motion generated in a process in which the user takes off the earbud and places the earbud back into the earbud case.

That the user takes off the earbud may be detected by using a wearing detection sensor. Placing the earbud back into the earbud case may be detected by using the charging metal device, the near field communications component, the laser transceiver, the infrared transceiver, and the like of each of the first cavity and the second cavity, or may be detected by using the charging metal device, the near field communications component, the laser transceiver, the infrared transceiver, and the like of each of the left bud and the right bud.

Specifically, the right bud is used as an example. In a process in which the user takes off the right bud and places the right bud back into the earbud case, if an earbud motion of the right bud is consistent with a preset specific motion, it may be determined that the right bud is incorrectly placed in the second cavity. The preset specific motion may be an earbud motion generated by the right bud in a process from taking off the right bud by the user to incorrectly placing the right bud in the second cavity.

The preset specific motion may include: performing, by the right bud, preset specific rotation around a Y-axis of the right bud. In a case, before the right bud is taken off, if the right bud is correctly worn on the right ear of the user, a rotation angle of the preset specific rotation is equal to 180° or close to 180°, so that when the right bud is placed into the earbud case, an orientation of an earbud mouth of the right bud is opposite to an orientation of a left ear of the user. In another case, before the right bud is taken off, if the right bud is incorrectly worn on the left ear of the user, the rotation angle of the preset specific rotation is equal to 0° or close to 0°, so that when the right bud is placed into the earbud case, the orientation of the earbud mouth of the right bud is opposite to the orientation of the left ear of the user. A condition for these two cases is that a posture in which the user holds the earbud case when the earbud is placed into the earbud case is a recommended holding posture. The recommended holding posture of the earbud case is usually convenient for the user to place the left bud and the right bud. After taking off the earbud, the user can place the earbud into a corresponding cavity without adjusting an orientation of an earbud mouth of the earbud.

Optionally, for a preset specific action, refer to an inverse process of a first wearing earbud motion to determine whether the earbud is incorrectly placed. Details are not described herein again.

Three solutions provided in the embodiments of this application, namely, the solution of identifying whether the earbud is incorrectly worn based on the wearing earbud motion, the solution of identifying whether the earbud is incorrectly worn based on the worn earbud motion, and the solution of detecting whether the left bud and the right bud are incorrectly placed in the earbud case, can be implemented independently or in combination. As described above, when the solution of identifying whether the earbud is incorrectly worn based on the worn earbud motion is combined with the solution of identifying whether the earbud is incorrectly worn based on the wearing earbud motion, a preliminary determining result of identifying whether the earbud is incorrectly worn based on the wearing earbud motion may be further calibrated. As described above, when the solution of detecting whether the left bud and the right bud are incorrectly placed in the earbud case is combined with the foregoing two solutions for identifying whether the earbud is incorrectly worn, a problem that the earbud is incorrectly worn next time due to incorrect placing of the earbud can be further avoided.

Figure 15:
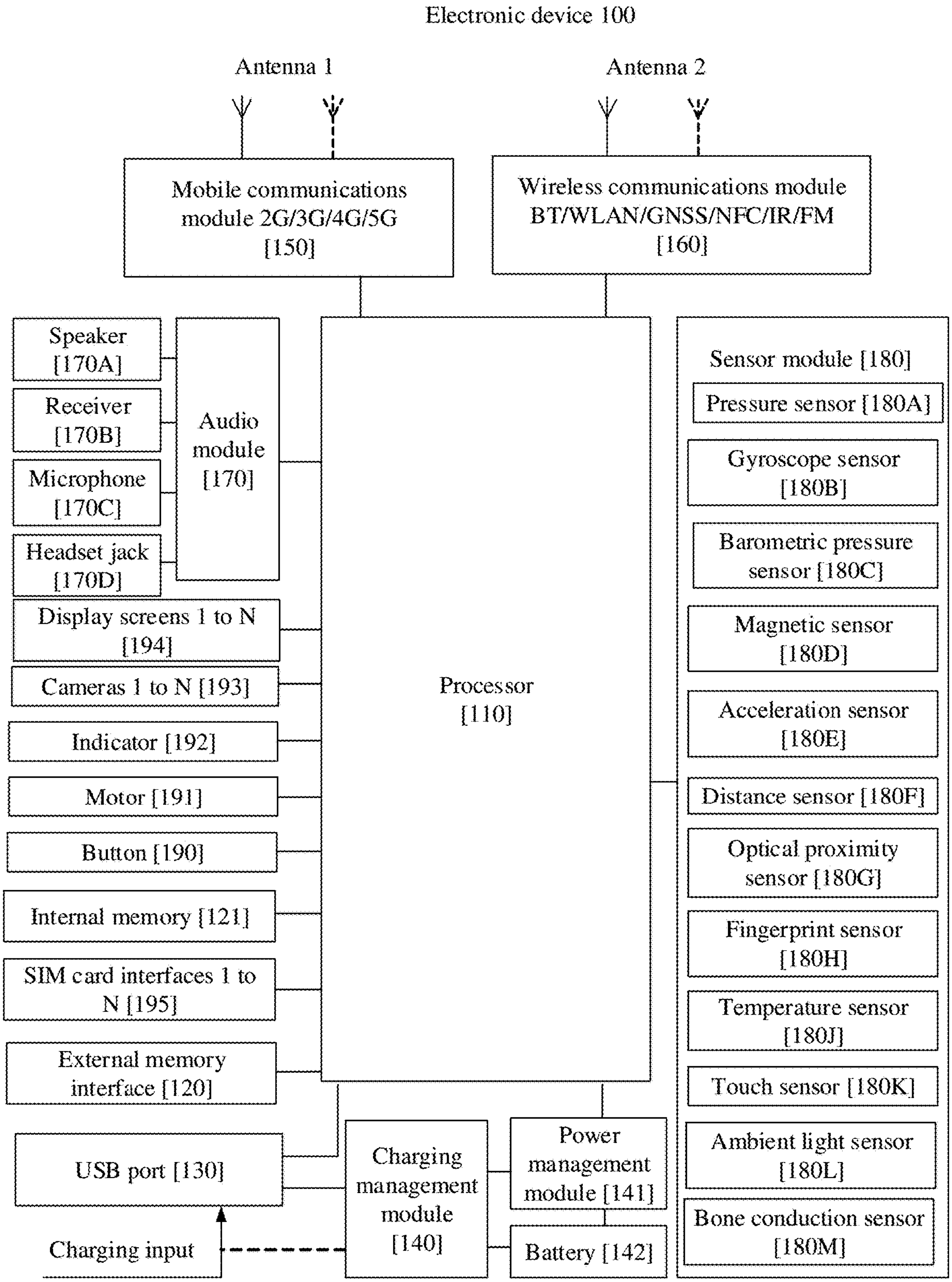
FIG. 15 shows an example of an electronic device according to an embodiment of this application.

FIG. 15 is a schematic diagram of a structure of an electronic device according to an embodiment of this application.

As shown in FIG. 15, the electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display screen 194, a subscriber identification module (subscriber identification module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction executing.

A memory may be further disposed in the processor 110, and is configured to store an instruction and data. In some embodiments, the memory in the processor 110 is a cache. The memory may store an instruction or data that has been used or cyclically used by the processor 110. If the processor 110 needs to use the instruction or the data again, the processor may directly invoke the instruction or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes a serial data line (serial data line, SDA) and a serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor no may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform the audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using a Bluetooth headset.

The MIPI interface may be configured to connect the processor 110 to a peripheral component such as the display screen 194 or the camera 193. The MIPI interface includes a camera serial interface (camera serial interface, CSI), a display serial interface (display serial interface, DSI), and the like. In some embodiments, the processor 110 communicates with the camera 193 through the CSI to implement a photographing function of the electronic device 100. The processor 110 communicates with the display screen 194 through the DSI to implement a display function of the electronic device 100.

The GPIO interface may be configured by software. The GPIO interface may be configured as a control signal or a data signal. In some embodiments, the GPIO interface may be configured to connect the processor 110 to the camera 193, the display screen 194, the wireless communications module 160, the audio module 170, the sensor module 180, or the like. The GPIO interface may alternatively be configured as an I2C interface, an I2S interface, a UART interface, an MIPI interface, or the like.

The USB port 130 is a port that conforms to a USB standard specification, and may be specifically a mini USB port, a micro USB port, a USB type-C port, or the like. The USB port 130 may be configured to connect to a charger to charge the electronic device 100, or may be configured to transmit data between the electronic device 100 and a peripheral device, or may be configured to connect to a headset for playing audio through the headset. The port may be configured to connect to another electronic device such as an AR device.

It may be understood that an interface connection relationship between the modules shown in this embodiment of this application is merely an example for description, and does not constitute a limitation on the structure of the electronic device 100. In some other embodiments of this application, the electronic device 100 may alternatively use an interface connection manner different from an interface connection manner in this embodiment, or use a combination of a plurality of interface connection manners.

The charging management module 140 is configured to detect charging input from a charger. The charger may be a wireless charger or a wired charger. In some embodiments of wired charging, the charging management module 140 may detect charging input of a wired charger through the USB port 130. In some embodiments of wireless charging, the charging management module 140 may detect wireless charging input through a wireless charging coil of the electronic device 100. The charging management module 140 may further supply power to the electronic device by using the power management module 141 when the battery 142 is charged.

The power management module 141 is configured to connect to the battery 142, the charging management module 140, and the processor 110. The power management module 141 detects input of the battery 142 and/or the charging management module 140, to supply power to the processor 110, the internal memory 121, the external memory interface 120, the display screen 194, the camera 193, the wireless communications module 160, and the like. The power management module 141 may be further configured to monitor a parameter such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communications function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and detect an electromagnetic wave signal. Each antenna in the electronic device 100 may be configured to cover one or more communications frequency bands. Different antennas may be multiplexed to improve antenna utilization. For example, the antenna 1 may be multiplexed as a diversity antenna of a wireless local area network. In some other embodiments, an antenna may be used in combination with a tuning switch.

The mobile communications module 150 may provide a wireless communications solution that includes 2G/3G/4G/5G or the like and that is applied to the electronic device 100. The mobile communications module 150 may include at least one filter, switch, power amplifier, low noise amplifier (low noise amplifier, LNA), and the like. The mobile communications module 150 may detect an electromagnetic wave through the antenna 1, perform processing such as filtering or amplification on the detected electromagnetic wave, and transmit the electromagnetic wave to the modem processor for demodulation. The mobile communications module 150 may further amplify a signal modulated by the modem processor, and convert, by using the antenna 1, the signal into an electromagnetic wave for radiation. In some embodiments, at least some functional modules in the mobile communications module 150 may be disposed in the processor 110. In some embodiments, at least some function modules of the mobile communications module 150 may be disposed in a same component with at least some modules of the processor 110.

The modem processor may include a modulator and a demodulator. The modulator is configured to modulate a to-be-sent low-frequency baseband signal into a medium-high frequency signal. The demodulator is configured to demodulate a detected electromagnetic wave signal into a low-frequency baseband signal. Then the demodulator transfers the low-frequency baseband signal obtained through demodulation to the baseband processor for processing. After being processed by the baseband processor, the low-frequency baseband signal is transmitted to the application processor. The application processor outputs a sound signal by using an audio output device (not limited to the speaker 170A, the receiver 170B, or the like), or displays an image or a video by using the display screen 194. In some embodiments, the modem processor may be an independent component. In some other embodiments, the modem processor may be independent of the processor 110, and is disposed in a same component as the mobile communications module 150 or another function module.

The wireless communications module 160 may provide a solution that is applied to the electronic device 100 and is for wireless communication such as a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 detects an electromagnetic wave through the antenna 2, performs frequency modulation and filtering processing on an electromagnetic wave signal, and sends a processed signal to the processor 110. The wireless communications module 160 may further detect a to-be-sent signal from the processor 110, perform frequency modulation and amplification on the to-be-sent signal, and convert, by using the antenna 2, the signal into an electromagnetic wave for radiation. For example, the wireless communications module 160 may include a Bluetooth module, a Wi-Fi module, and the like.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, and/or an IR technology. The GNSS may include a global positioning system (global positioning system, GPS), a global navigation satellite system (global navigation satellite system, GLONASS), a BeiDou navigation satellite system (Beidou navigation satellite system, BDS), a quasi-zenith satellite system (quasi-zenith satellite system, QZSS), and/or a satellite based augmentation system (satellite based augmentation system, SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric computation, and render an image. The processor 110 may include one or more GPUs, and the GPUs execute a program instruction to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light-emitting diode, QLED), or the like. In some embodiments, the electronic device 100 may include one or N display screens 194, where N is a positive integer greater than 1.

The electronic device 100 may implement a photographing function by using the ISP, the camera 193, the video coder/decoder, the GPU, the display screen 194, the application processor, and the like.

The ISP is configured to process data fed back by the camera 193. For example, during shooting, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a shooting scenario. In some embodiments, the ISP may be disposed in the camera 193.

The camera 193 is configured to capture a static image or a video. An object generates, through a lens, an optical image to be projected to the photosensitive element. The photosensitive element may be a charge coupled device (charge coupled device, CCD) or a complementary metal-oxide-semiconductor (complementary metal-oxide-semiconductor, CMOS) optoelectronic transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in a format such as RGB or YUV. In some embodiments, the electronic device 100 may include one or N cameras 193, where N is a positive integer greater than 1.

The digital signal processor is configured to process a digital signal, and may process another digital signal in addition to a digital image signal. For example, when the electronic device 100 selects a frequency, the digital signal processor is configured to perform Fourier transform on frequency energy.

The video codec is configured to: compress or decompress a digital video. The electronic device 100 may support one or more video codecs. Therefore, the electronic device 100 may play or record videos in a plurality of coding formats, for example, a moving picture experts group (moving picture experts group, MPEG) 1, an MPEG 2, an MPEG 3, and an MPEG 4.

The NPU is a neural-network (neural-network, NN) computing processor, quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 by using the external memory interface 120, to implement a data storage function. For example, a music file or a video file is stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data, and a phone book) created in a process of using the electronic device 100, and the like. In addition, the internal memory 121 may include a high-speed random access memory, and may further include a nonvolatile memory, for example, at least one magnetic disk storage device, a flash memory device, or a universal flash storage (universal flash storage, UFS). The processor 110 runs instructions stored in the internal memory 121 and/or instructions stored in the memory disposed in the processor, to perform various function applications and data processing of the electronic device 100.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to encode and decode an audio signal. In some embodiments, the audio module 170 may be disposed in the processor 110, or some function modules in the audio module 170 are disposed in the processor 110.

The speaker 170A, also referred to as a "loudspeaker", is configured to convert an electrical audio signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or speech information is received through the electronic device 100, the receiver 170B may be put close to a human ear to listen to a voice.

The microphone 170C, also referred to as a "mike" or a "microphone", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, implement noise reduction, and identify a sound source, to implement a directional recording function and the like.

The headset jack 1701) is configured to connect to a wired headset. The headset jack 170D may be the USB port 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display screen 194. There are a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display screen 194, the electronic device 100 detects intensity of the touch operation through the pressure sensor 180A. The electronic device 100 may calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an application icon "Messages", an instruction for viewing an SMS message is executed. When a touch operation whose touch operation intensity is greater than or equal to the first pressure threshold is performed on the application icon "Messages", an instruction for creating an SMS message is executed.

The gyroscope sensor 180B may be configured to determine a motion posture of the electronic device 100. In some embodiments, angular velocities of the electronic device 100 around three axes (which are x, y, and z axes) may be determined by using the gyroscope sensor 180B. The gyroscope sensor 180B may be configured to implement image stabilization during shooting. For example, when the shutter is pressed, the gyroscope sensor 180B detects an angle at which the electronic device 100 jitters, obtains, through calculation based on the angle, a distance for which a lens module needs to compensate, and allows the lens to cancel the jitter of the electronic device 100 through reverse motion, to implement image stabilization. The gyroscope sensor 180B may be further used in a navigation scenario and a motion-sensing game scenario.

The barometric pressure sensor 180C is configured to measure barometric pressure. In some embodiments, the electronic device 100 calculates an altitude through the barometric pressure measured by the barometric pressure sensor 180C, to assist in positioning and navigation.

The magnetic sensor 180D includes a Hall effect sensor. The electronic device 100 may detect opening and closing of a flip cover leather case by using the magnetic sensor 180D. In some embodiments, when the electronic device 100 is a flip device, the electronic device 100 may detect opening and closing of the flip by using the magnetic sensor 180D. Further, a feature such as automatic unlocking upon opening of the flip cover is set based on a detected opening or closing state of the flip cover.

The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between landscape mode and portrait mode or a pedometer.

The distance sensor 180F is configured to measure a distance. The electronic device 100 may measure a distance in an infrared manner or a laser manner. In some embodiments, in a shooting scenario, the electronic device 100 may measure a distance through the distance sensor 180F, to implement quick focusing.

The optical proximity sensor 180G may include, for example, a light emitting diode (LED) and an optical detector, for example, a photodiode. The light-emitting diode may be an infrared light-emitting diode. The electronic device 100 emits infrared light by using the light-emitting diode.

The electronic device 100 detects infrared reflected light from a nearby object through the photodiode. When robust reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that a user holds the electronic device 100 close to an ear for a call, to automatically perform screen-off for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display screen 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based shooting, fingerprint-based call answering, and the like.

The temperature sensor 180J is configured to detect a temperature. In some embodiments, the electronic device 100 executes a temperature processing policy through the temperature detected by the temperature sensor 180J. For example, when the temperature reported by the temperature sensor 180J exceeds a threshold, the electronic device 100 lowers performance of a processor nearby the temperature sensor 180J, to reduce power consumption for thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142, to prevent abnormal power-off caused by a low temperature.

The touch sensor 180K is also referred to as a "touch panel". The touch sensor 180K may be disposed on the display screen 194, and the touch sensor 180K and the display screen 194 form a touchscreen, which is also referred to as a "touch control screen". The touch sensor 180K is configured to detect a touch operation performed on or near the touch sensor 180K. The touch sensor may transfer the detected touch operation to the application processor to determine a type of a touch event. A visual output related to the touch operation may be provided through the display screen 194. In some other embodiments, the touch sensor 180K may alternatively be disposed on a surface of the electronic device 100 at a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to detect a blood pressure beating signal. In some embodiments, the bone conduction sensor 180M may alternatively be disposed in the headset, to form a bone conduction headset. The audio module 170 may parse out, based on the vibration signal of the vibration bone of the vocal-cord part obtained by the bone conduction sensor 180M, a voice signal to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may detect a button input, and generate a button signal input related to a user setting and function control of the electronic device 100.

The motor 191 may generate a vibration prompt. The motor 191 may be configured to provide an incoming call vibration prompt or a touch vibration feedback. For example, touch operations performed on different applications (for example, photographing and audio playing) may correspond to different vibration feedback effects. The motor 191 may also correspond to different vibration feedback effects for touch operations performed on different areas of the display screen 194. Different application scenarios (for example, a time reminder, information detecting, an alarm clock, and a game) may also correspond to different vibration feedback effect. A touch vibration feedback effect may be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may also be compatible to different types of SIM cards. The SIM card interface 195 may also be compatible to an external storage card. The electronic device 100 interacts with a network through the SIM card, to implement functions such as conversation and data communication. In some embodiments, the electronic device 100 uses an eSIM, that is, an embedded SIM card. The eSIM card may be embedded into the electronic device 100, and cannot be separated from the electronic device 100.

The foregoing specifically describes this embodiment of this application by using the electronic device 100 as an example. It should be understood that the structure shown in this embodiment of this application does not constitute a specific limitation on the electronic device 100. The electronic device 100 may have more or fewer components than those shown in the figure, may combine two or more components, or may have different component configurations. Components shown in the figure may be implemented by hardware including one or more signal processing and/or application-specific integrated circuits, software, or a combination of hardware and software.

Figure 16:
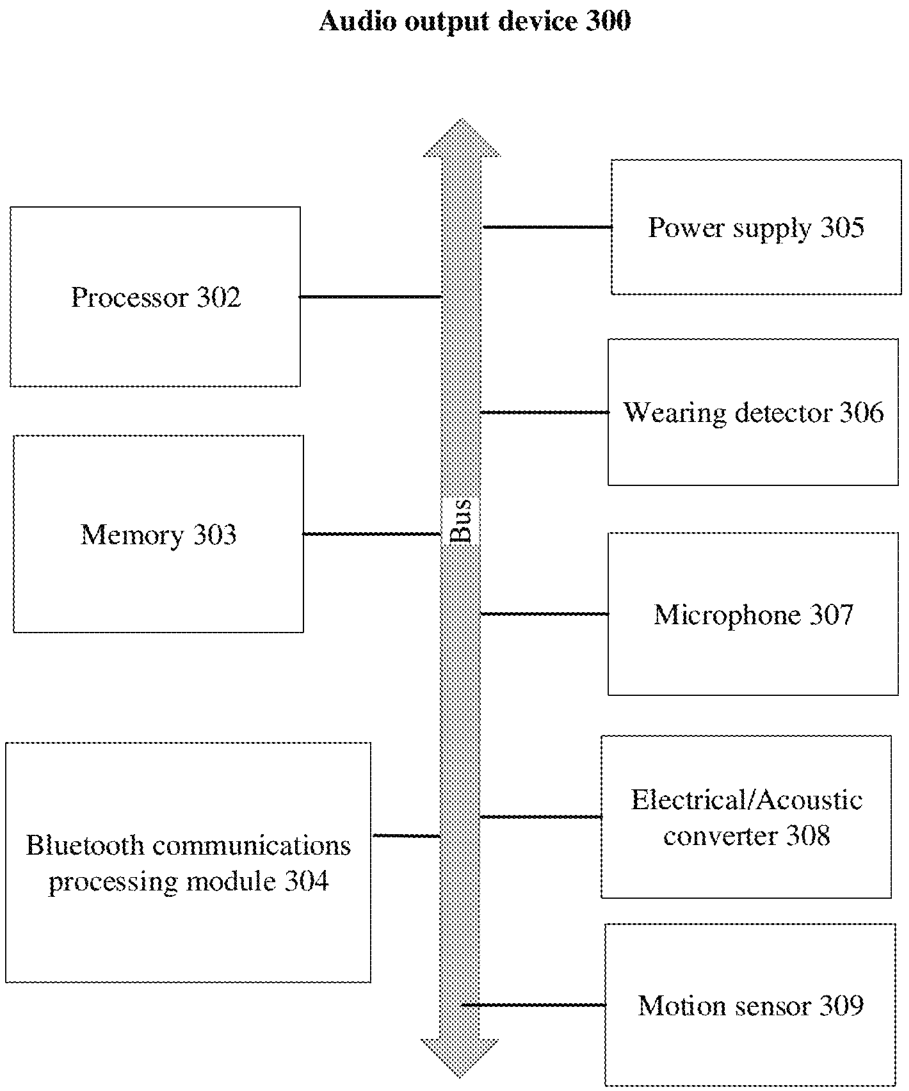
FIG. 16 shows an example of an audio output device according to an embodiment of this application.

FIG. 16 is a schematic diagram of a structure of an audio output device 300 according to an embodiment of this application.

The audio output device 300 may be the audio output device 201 or the audio output device 202 in the wireless audio device 200 shown in FIG. 1A, for example, a headset, and may convert audio data from an audio source (such as a smartphone) into sound. In some scenarios, if a sound collection device such as a microphone/receiver is configured, the audio output device 300 may also be used as an audio source to transmit audio data (for example, audio data converted from a voice of the user collected by a headset) to another device (for example, a mobile phone).

FIG. 16 is an example of a schematic diagram of a structure of an audio output device 300 according to an embodiment of this application. As shown in FIG. 16, the audio output device 300 may include a processor 302, a memory 303, a Bluetooth communications processing module 304, a power supply 305, a wearing detector 306, a microphone 307, an electrical/acoustic converter 308, and a motion sensor 309. These components may be connected through a bus, and details are as follows.

The processor 302 may be configured to read and execute a computer-readable instruction. In a specific implementation, the processor 302 may mainly include a controller, an arithmetic unit, and a register. The controller is mainly responsible for decoding instructions and sending a control signal for an operation corresponding to the instructions. The arithmetic unit is mainly responsible for performing a fixed-point or floating-point arithmetic operation, a shift operation, a logic operation, and the like, and may also perform an address operation and address translation. The register is mainly responsible for saving a quantity of register operations, intermediate operation results, and the like that are temporarily stored during instruction execution. In a specific implementation, a hardware architecture of the processor 302 may be an application-specific integrated circuit (Application Specific Integrated Circuit, ASIC) architecture, an MIPS architecture, an ARM architecture, an NP architecture, or the like.

In some embodiments, the processor 302 may be configured to parse a signal detected by the Bluetooth communications processing module 304, for example, a signal encapsulated with audio data, a content control message, or a flow control message. The processor 302 may be configured to perform a corresponding processing operation based on a parsing result, for example, drive the electrical/acoustic converter 308 to start, pause, or stop converting the audio data into sound.

In some embodiments, the processor 302 may be further configured to generate a signal sent by the Bluetooth communications processing module 304 to the outside, for example, a Bluetooth broadcast signal or a beacon signal, or audio data converted from collected sound.

The memory 303 is coupled to the processor 302, and is configured to store various software programs and/or a plurality of sets of instructions. In a specific implementation, the memory 303 may include a high-speed random access memory, and may further include a nonvolatile memory, for example, one or more magnetic disk storage devices, a flash memory device, or another nonvolatile solid-state storage device. The memory 303 may store an operating system, for example, an embedded operating system such as uCOS, VxWorks, or RTLinux. The memory 303 may further store a communications program, and the communications program may be used to communicate with the electronic device 100, one or more servers, or an additional device.

The Bluetooth (BT) communications processing module 304 may detect a signal transmitted by another device (for example, the electronic device 100), for example, a scanning signal, a broadcast signal, a signal encapsulated with audio data, a content control message, or a flow control message. The Bluetooth (BT) communications processing module 304 may also transmit a signal, for example, a broadcast signal, a scanning signal, a signal encapsulated with audio data, a content control message, or a flow control message.

The power supply 305 may be configured to supply power to other internal components such as the processor 302, the memory 303, the Bluetooth communications processing module 304, the wearing detector 306, and the electrical/acoustic converter 308.

The wearing detector 306 can be used to detect a state in which the audio output device 300 is worn by the user, such as not being worn, being worn, and even including a wearing tightness state. In some embodiments, the wearing detector 306 may be implemented by one or more of sensors such as a distance sensor, a pressure sensor, and the like. The wearing detector 306 may transmit a detected wearing state to the processor 302. In this way, the processor 302 can be powered on when the audio output device 300 is worn by the user, and powered off when the audio output device 300 is not worn by the user, to reduce power consumption.

The motion sensor 309 may be configured to detect a motion posture of the earbud, and may include a gyroscope sensor, an acceleration sensor, a magnetic field detection sensor, and the like, and may collect, for example, a rotation value (for example, a rotation direction or a rotation angle) and a movement value (for example, an acceleration or displacement) in each direction.

The microphone 307 may be configured to collect sound, for example, voice of a user, and may output the collected sound to the electrical/acoustic converter 308. In this way, the electrical/acoustic converter 308 may convert the sound collected by the microphone 307 into audio data.

The electrical/acoustic converter 308 may be configured to convert sound into an electrical signal (audio data), for example, convert the sound collected by the microphone 307 into the audio data, and may transmit the audio data to the processor 302. In this way, the processor 302 may trigger the Bluetooth (BT) communications processing module 304 to transmit the audio data. The electrical/acoustic converter 308 may be further configured to convert an electrical signal (audio data) into sound, for example, convert audio data output by the processor 302 into sound. The audio data output by the processor 302 may be detected by the Bluetooth (BT) communications processing module 304.

In some implementations, the processor 302 may implement a host in a Bluetooth protocol framework, the Bluetooth (BT) communications processing module 304 may implement a controller in the Bluetooth protocol framework, and the host and the controller communicate with each other through an HCI. That is, functions of the Bluetooth protocol framework are distributed on two chips.

In some other embodiments, the processor 302 may implement the host and the controller in the Bluetooth protocol framework. That is, all functions of the Bluetooth protocol framework are placed on a same chip. That is, the host and controller are placed on the same chip. Because the host and controller are placed on the same chip, the physical HCI is unnecessary, and the host and controller directly interact through an application programming interface API.

It may be understood that the structure shown in FIG. 16 does not constitute a specific limitation on the audio output device 300. In some other embodiments of this application, the audio output device 300 may include more or fewer components than those shown in the figure, or combine some components, or split some components, or have different component arrangements. The components shown in the figure may be implemented by hardware, software, or a combination of software and hardware.

It should be understood that, in the specification, claims, and accompanying drawings of this application, the terms "first", "second", and the like are intended to distinguish different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

Mentioning an "embodiment" in the present invention means that a particular characteristic, structure, or feature described with reference to the embodiment may be included in at least one embodiment of the present invention. The phrase shown in various locations in this specification may not necessarily refer to a same embodiment, and is not an independent or optional embodiment exclusive from another embodiment. It is explicitly and implicitly understood by a person skilled in the art that embodiments described in the present invention may be combined with another embodiment.

In addition, it should be noted herein that an embodiment of the present invention further provides a computer storage medium, the computer storage medium stores a computer program executed by the foregoing target detection apparatus, and the computer program includes a program instruction. When executing the program instruction, the processor can perform the foregoing description of the target detection method. Therefore, details are not described herein again. In addition, beneficial effects of using the same method are not described again. For technical details that are not disclosed in the embodiment of the computer storage medium involved in the present invention, refer to the description of the method embodiment of the present invention.

Those of ordinary skill in the art can understand that some or all processes of the realization of the foregoing method in the embodiments can be implemented by instructing relevant hardware by the computer program. The foregoing program may be stored in a computer-readable storage medium, where when the program is executed, the processes of the embodiments of the foregoing methods can be included. The storage medium may be: a magnetic disk, an optical disc, a read-only memory (Read-Only Memory, ROM), a random access memory (Random Access Memory, RAM), or the like.

What is disclosed above is merely example embodiments of the present invention, and certainly is not intended to limit the protection scope of the present invention. Therefore, equivalent variations made in accordance with the claims of the present invention shall fall within the scope of the present invention.

What is claimed is:

1. A method, comprising:

detecting, by an audio communications system, that a first earbud is worn on a first ear or a second ear of a user, wherein the first earbud is configured to be worn on the first ear of the user, wherein the audio communications system comprises a pair of wireless earbuds, and the pair of wireless earbuds comprises the first earbud and a second earbud;

detecting an earbud motion generated after the first earbud is worn on the first ear or the second ear of the user; and determining, based on the earbud motion generated after the first earbud is worn on the first ear or the second ear of the user, whether the first earbud is incorrectly worn on the second ear of the user, wherein determining, based on the earbud motion generated after the first earbud is worn on the first ear or the second ear of the user, whether the first earbud is incorrectly worn on the second ear of the user comprises:

in response to the earbud motion generated after the first earbud is worn on the first ear or the second ear of the user being consistent with a second motion, determining that the first earbud is incorrectly worn on the second ear, wherein the second motion comprises an earbud motion generated with a head motion after the first earbud is incorrectly worn on the second ear.

2. The method according to claim 1, wherein that the earbud motion generated after the first earbud is worn on the first ear or the second ear of the user is consistent with the second motion comprises:

after the first earbud is worn on the first ear or the second ear of the user, rotation of the first earbud is consistent with second rotation; and the second motion comprises the second rotation, and the second rotation is rotation, generated with the head motion after the first earbud is incorrectly worn on the second ear, around a Y-axis, an X-axis, or a Z-axis of the first earbud, wherein a positive direction of the Y-axis of the first earbud points from a center-of-mass of the first earbud to a top of the first earbud, a positive direction of the X-axis points from the center-of-mass of the first earbud to an earbud mouth of the first earbud, and a positive direction of the Z-axis points from the center-of-mass of the first earbud to a right side of the first earbud.

3. The method according to claim 1, wherein that the earbud motion generated after the first earbud is worn on the first ear or the second ear of the user is consistent with the second motion comprises:

after the first earbud is worn on the first ear or the second ear of the user, displacement of the first earbud in a carrier coordinate system of a head of the user is consistent with second displacement; and the second motion comprises the second displacement, and the second displacement is displacement on a Y-axis, an X-axis, or a Z-axis of the head of the user generated with the head motion after the first earbud is incorrectly worn on the second ear, wherein in the carrier coordinate system of the head of the user, a positive direction of the Y-axis points from a head center-of-mass to a top of the head, a positive direction of the Z-axis points from the head center-of-mass to a face, and a positive direction of the X-axis points from the head center-of-mass to a left ear.

4. The method according to claim 1, wherein the audio communications system further comprises an electronic device having an established wireless communications connection with the pair of wireless earbuds, and the method further comprises: when the pair of wireless earbuds is in a single-earbud mode and a used single earbud is the first earbud, in response to the first earbud being incorrectly worn, providing a reminder, on the electronic device to the user, that the first earbud is incorrectly worn.

5. The method according to claim 1, wherein the audio communications system further comprises an electronic device having an established wireless communications connection with the pair of wireless earbuds, and the method further comprises: when the pair of wireless earbuds is in a dual-earbud mode, in response to detecting that the second earbud is also worn on the first ear of the user and detecting that the first earbud is incorrectly worn, providing a reminder, on the electronic device, to switch between a left bud and a right bud for wearing.

6. The method according to claim 1, wherein the audio communications system further comprises an electronic device having an established wireless communications connection with the pair of wireless earbuds, and the method further comprises: when the pair of wireless earbuds is in a dual-earbud mode, in response to detecting that the second earbud is also worn on the first ear of the user and detecting that the first earbud is incorrectly worn, performing left-right sound channel switching on the first earbud and the second earbud.

7. A method, comprising:

detecting, by an audio communications system, that a first earbud is removed from a first ear of a user, wherein the audio communications system comprises a pair of wireless earbuds with an earbud case, the pair of wireless earbuds comprises the first earbud and a second earbud, the earbud case has a first cavity and a second cavity that are respectively configured to place the first earbud and the second earbud;

detecting that the first earbud is placed in the earbud case;

detecting an earbud motion of the first earbud in a process in which the user takes off the first earbud and puts the first earbud back into the earbud case; and determining, based on the earbud motion of the first earbud in the process in which the user takes off the first earbud and puts the first earbud back into the earbud case, whether the first earbud is incorrectly placed in the second cavity.

8. The method according to claim 7, wherein determining, based on the earbud motion of the first earbud in the process in which the user takes off the first earbud and puts the first earbud back into the earbud case, whether the first earbud is incorrectly placed in the second cavity comprises:

in response to the earbud motion of the first earbud in the process in which the user takes off the first earbud and puts the first earbud back into the earbud case being consistent with a third motion, determining that the first earbud is incorrectly placed in the second cavity, wherein the third motion comprises an earbud motion generated by the first earbud in a process from taking off the first earbud by the user to incorrectly placing the first earbud in the second cavity.

9. The method according to claim 8, wherein that the earbud motion of the first earbud in the process in which the user takes off the first earbud and puts the first earbud back into the earbud case is consistent with the third motion comprises:

rotation of the first earbud in the process in which the user takes off the first earbud and puts the first earbud back into the earbud case is consistent with third rotation; and the third motion comprises the third rotation, and the third rotation comprises rotation of the first earbud around a Y-axis of the first earbud in the process from taking off the first earbud by the user to incorrectly placing the first earbud in the second cavity, wherein a positive direction of the Y-axis of the first earbud points from a center-of-mass of the first earbud to a top of the first earbud.

10. The method according to claim 7, further comprising: in response to detecting that the second earbud is also placed in the earbud case and in response to detecting that the first earbud is incorrectly placed in the second cavity, switching between a left bud mode and a right bud mode for the first earbud and the second earbud.

11. An electronic device, comprising:

a wireless transceiver configured to receive a first earbud motion that is sent by a first earbud and that is generated after the first earbud is worn on a first ear or a second ear of a user, wherein the electronic device and a pair of wireless earbuds form an audio communications system, the pair of wireless earbuds comprises the first earbud and a second earbud, and the first earbud is configured to be worn on the first ear of the user; and at least one processor is configured to determine, based on the first earbud motion generated after the first earbud is worn on the first ear or the second ear of the user, whether the first earbud is incorrectly worn on the second ear of the user, wherein determining, based on the first earbud motion generated after the first earbud is worn on the first ear or the second ear of the user, whether the first earbud is incorrectly worn on the second ear of the user comprises:

in response to the first earbud motion generated after the first earbud is worn on the first ear or the second ear of the user being consistent with a second motion, determining that the first earbud is incorrectly worn on the second ear, wherein the second motion comprises an earbud motion generated with a head motion after the first earbud is incorrectly worn on the second ear.

12. The electronic device according to claim 11, wherein that the first earbud motion generated after the first earbud is worn on the first ear or the second ear of the user is consistent with the second motion comprises:

after the first earbud is worn on the first ear or the second ear of the user, rotation of the first earbud is consistent with second rotation; and the second motion comprises the second rotation, and the second rotation is rotation, generated with the head motion after the first earbud is incorrectly worn on the second ear, around a Y-axis, an X-axis, or a Z-axis of the first earbud, wherein a positive direction of the Y-axis of the first earbud points from a center-of-mass of the first earbud to a top of the first earbud, a positive direction of the X-axis points from the center-of-mass of the first earbud to an earbud mouth of the first earbud, and a positive direction of the Z-axis points from the center-of-mass of the first earbud to a right side of the first earbud.

13. The electronic device according to claim 11, wherein that the first earbud motion generated after the first earbud is worn on the first ear or the second ear of the user is consistent with the second motion comprises:

after the first earbud is worn on the first ear or the second ear of the user, displacement of the first earbud in a carrier coordinate system of a head of the user is consistent with second displacement; and the second motion comprises the second displacement, and the second displacement is displacement on a Y-axis, an X-axis, or a Z-axis of the head of the user generated with head motion of the head after the first earbud is incorrectly worn on the second ear, wherein in the carrier coordinate system of the head of the user, a positive direction of the Y-axis points from a head center-of-mass to a top of the head, a positive direction of the Z-axis points from the head center-of-mass to a face, and a positive direction of the X-axis points from the head center-of-mass to a left ear.

14. The electronic device according to claim 11, wherein the electronic device further comprises a display, wherein the display is configured to in response to the pair of wireless earbuds being in a single-earbud mode, a used single earbud is the first earbud, and the first earbud is incorrectly worn, display a reminder to the user that the first earbud is incorrectly worn.

15. The electronic device according to claim 11, wherein the electronic device further comprises a display, and the display is configured to: in response to the pair of wireless earbuds being in a dual-earbud mode, detect that the second earbud is also worn on the first ear of the user, and the first earbud is incorrectly worn, display a reminder to the user to switch between a left bud and a right bud for wearing.

16. The electronic device according to claim 11, wherein the at least one processor is further configured to: in response to the pair of wireless earbuds being in a dual-earbud mode, detect that the second earbud is also worn on the first ear of the user, and the first earbud is incorrectly worn, perform left-right sound channel switching on the first earbud and the second earbud.

17. The electronic device according to claim 11, wherein the at least one processor is further configured to:

detect a second earbud motion of the first earbud in a process in which the user wears the first earbud;

detect that the first earbud is worn on the first ear or the second ear of the user; and determine, based on the second earbud motion of the first earbud in the process in which the user wears the first earbud, whether the first earbud is incorrectly worn.

18. The electronic device according to claim 17, wherein the at least one processor is further configured to:

determine, based on the first earbud motion and the second earbud motion, whether a result of determining whether the first earbud is incorrectly worn is correct.

* * * * *